United States Patent [19]
Yamamoto et al.

[11] Patent Number: 6,098,035
[45] Date of Patent: Aug. 1, 2000

[54] MORPHOLOGICAL ANALYSIS METHOD AND DEVICE AND JAPANESE LANGUAGE MORPHOLOGICAL ANALYSIS METHOD AND DEVICE

[75] Inventors: Hideki Yamamoto; Mihoko Kitamura; Sayori Shimohata, all of Tokyo; Mikio Yamamoto, Tsukuba, all of Japan

[73] Assignee: Oki Electric Industry Co., Ltd., Tokyo, Japan

[21] Appl. No.: 09/044,137

[22] Filed: Mar. 19, 1998

[30] Foreign Application Priority Data

| Mar. 21, 1997 | [JP] | Japan | 9-068300 |
| Feb. 3, 1998 | [JP] | Japan | 10-021929 |

[51] Int. Cl.⁷ ................................................ G06F 17/27
[52] U.S. Cl. ............................................ 704/9; 707/531
[58] Field of Search .......................... 704/9, 10, 1, 2, 704/4, 5, 7, 8, 255, 256, 257, 270, 271; 707/530, 531, 532, 533, 536; 434/156, 157, 167, 169

[56] References Cited

U.S. PATENT DOCUMENTS

| 4,964,044 | 10/1990 | Kumano et al. ............................. 704/6 |
| 5,321,608 | 6/1994 | Namba et al. ................................ 704/9 |
| 5,426,583 | 6/1995 | Uribe-Echebarria Diaz De Mendibil ...................... 704/2 |
| 5,619,410 | 4/1997 | Emori et al. ................................ 704/7 |
| 5,835,893 | 11/1998 | Ushioda ................................... 704/257 |
| 5,946,648 | 8/1999 | Halstead, Jr. et al. ....................... 704/9 |
| 5,963,893 | 10/1999 | Halstead, Jr. et al. ....................... 704/9 |

FOREIGN PATENT DOCUMENTS

| 40-7036917A | 2/1995 | Japan . |
| 40-7271792A | 10/1995 | Japan . |
| 08315078 | 11/1996 | Japan . |
| 41-0326275A | 12/1998 | Japan . |
| 41-1085744A | 3/1999 | Japan . |

OTHER PUBLICATIONS

Nagata, Masaaki, A Stochastic Japanese Morphological Analyzer Using A Forward–DP Backward–A* N–Best Search Algorithm, pp. 1–7.

*Primary Examiner*—Joseph Thomas
*Attorney, Agent, or Firm*—Rabin & Champagne, P.C.

[57] ABSTRACT

There is provided a morphological analysis method and device whereby, even if unknown words are present, processing can be effected with high accuracy and at high speed and economy of resources can be achieved. Expanded characters $e_i$ are generated by adding to each character $c_i$ of input text, in addition to word division information $d_i$, expansion information including required arbitrarily selectable information such as tag information, and all possible expanded character sequences are generated. Beforehand, by training, the partial chain probabilities (appearance probabilities) of N-gram (where, normally N=1 or 2 or 3) character sequences are stored in an expanded character table. The partial character sequences of the expanded character sequences are successively extracted from the beginning of the expanded character sequence and the respective partial chain probabilities are found by referring to the expanded character table, and the product of the thus-found partial chain probabilities is obtained. This product is found for all the expanded character sequences, and analysis results etc. consisting of a row of word sequences in order of character sequences corresponding to largest such products, as well as a row of tag sequences and/or arbitrarily selectable information is output as the morphological analysis result.

34 Claims, 15 Drawing Sheets

FIG. 4(A)

| $c_{-1}$ | $c_0$ | $c_1$ | $c_2$ | $c_3$ | $c_4$ | $c_5$ |
|---|---|---|---|---|---|---|
| # | # | 今 | 日 | は | # | # |

FIG. 4(B)

| $c_{-1}$ | $c_0$ | $c_1$ | $c_2$ | $c_3$ | $c_4$ |
|---|---|---|---|---|---|
| # | # | 今 | 日 | # | # |

FIG. 7(A)

| $c_{-(N-1)+1}$ | $c_{-(N-1)+2}$ | ...... | $c_{n+(N-1)}$ | |
|---|---|---|---|---|
| $d_{-(N-1)+1}$ | $d_{-(N-1)+2}$ | ...... | $d_{n+(N-1)}$ | p(W,T) |
| $e_{-(N-1)+1}$ | $e_{-(N-1)+2}$ | | $e_{n+(N-1)}$ | |

FIG. 7(B)

| $e_{-1}, e_0, \ldots e_5$ | p(W,T) |
|---|---|
| #, 1, 今, 1, □, 0, は, 0, #, 1, #, 1 | |
| #, 1, 今, 1, □, 0, は, 0, #, 1, #, 1 | |
| #, 1, 今, 1, □, 0, は, 1, #, 1, #, 1 | |
| #, 1, 今, 1, □, 1, は, 0, #, 1, #, 1 | |
| #, 1, 今, 1, □, 1, は, 1, #, 1, #, 1 | |
| #, 1, 今, 1, □, 0, は, 0, #, 1, #, 1 | |
| #, 1, 今, 1, □, 1, は, 0, #, 1, #, 1 | |
| #, 1, 今, 1, □, 1, は, 1, #, 1, #, 1 | |

FIG. 8(A)

| $e_{i-N+1}$ | | $e_{i-N+2}$ | | ...... | $e_i$ | | |
|---|---|---|---|---|---|---|---|
| $c_{i-N+1}$ | $d_{i-N+1}$ | $c_{i-N+2}$ | $d_{i-N+2}$ | ...... | $c_i$ | $d_i$ | $p(e_i)$ |

FIG. 8(B)

| $e_{i-2}, e_{i-1}, e_i$ | | | $p(e_i \mid e_{i-1}, e_{i-2})$ |
|---|---|---|---|
| <#, 1> <#, 1> <今, 0> | | | 0.0832 |
| <#, 1> <#, 1> <今, 1> | | | 0.0226 |
| <#, 1> <今, 0> <日, 0> | | | 0.0134 |
| <#, 1> <今, 0> <日, 1> | | | 0.0902 |
| <#, 1> <今, 1> <日, 0> | | | 0.0751 |
| <#, 1> <今, 1> <日, 1> | | | 0.0326 |
| <今, 0> <日, 0> <は, 0> | | | 0.0101 |
| <今, 0> <日, 0> <は, 1> | | | 0.0938 |
| <今, 0> <日, 1> <は, 0> | | | 0.0192 |
| <今, 0> <日, 1> <は, 1> | | | 0.0955 |
| <今, 1> <日, 0> <は, 0> | | | 0.0582 |
| <今, 1> <日, 0> <は, 1> | | | 0.054 |
| <今, 1> <日, 1> <は, 0> | | | 0.0332 |
| <今, 1> <日, 1> <は, 1> | | | 0.0792 |
| ⋮ | ⋮ | ⋮ | ⋮ |

FIG. 9

| $e_{-1}, e_0, \cdots e_5$ | | | | | | | | | | | | | | | | | p(W,T) |
|---|---|---|---|---|---|---|---|---|---|---|---|---|---|---|---|---|---|
| <#, | 1, | 今, | 1, | #, | 0, | 日, | 0, | は, | 1, | #, | 1, | #, | 1,| #, | 1, | > | $0.011 \times 10^{-3}$ |
| <#, | 1, | 今, | 1, | #, | 0, | 日, | 0, | は, | 1, | #, | 1, | #, | 1, | #, | 1, | > | $0.104 \times 10^{-3}$ |
| <#, | 1, | 今, | 1, | #, | 0, | 日, | 1, | は, | 1, | #, | 0, | #, | 1, | #, | 1, | > | $0.144 \times 10^{-3}$ |
| <#, | 1, | 今, | 1, | #, | 1, | 日, | 1, | は, | 1, | #, | 1, | #, | 1, | #, | 1, | > | $0.716 \times 10^{-3}$ |
| <#, | 1, | 今, | 1, | #, | 1, | 日, | 0, | は, | 1, | #, | 0, | #, | 1, | #, | 1, | > | $0.098 \times 10^{-3}$ |
| <#, | 1, | 今, | 1, | #, | 1, | 日, | 0, | は, | 1, | #, | 1, | #, | 1, | #, | 1, | > | $0.091 \times 10^{-3}$ |
| <#, | 1, | 今, | 1, | #, | 1, | 日, | 1, | は, | 1, | #, | 0, | #, | 1, | #, | 1, | > | $0.024 \times 10^{-3}$ |
| <#, | 1, | 今, | 1, | #, | 1, | 日, | 1, | は, | 1, | #, | 1, | #, | 1, | #, | 1, | > | $0.583 \times 10^{-3}$ |

FIG. 10(A)

| $e_{-(N-1)+1}$ | | | $e_{-(N-1)+2}$ | | | ... | $e_{n+(N-1)}$ | | | $p(e_i)$ |
|---|---|---|---|---|---|---|---|---|---|---|
| $c_{-(N-1)+1}$ | $d_{-(N-1)+1}$ | $t_{-(N-1)+1}$ | $c_{-(N-1)+2}$ | $d_{-(N-1)+2}$ | $t_{-(N-1)+2}$ | ... | $c_{n+(N-1)}$ | $d_{n+(N-1)}$ | $t_{n+(N-1)}$ | |

FIG. 10(B)

| $e_{-1}, e_0, \ldots e_4$ | $p(W,T)$ |
|---|---|
| #<>#, 1, #<>#, #<今>#, 0, <日>, 1, <名詞><>##, 1, #<>##, 1, #<>## | |
| #<>#, 1, #<>#, #<今>#, 0, <日>, 1, <名詞><>##, 1, #<>##, 1, #<>## | |
| #<>#, 1, #<>#, #<今>#, 0, <日>, 1, <名詞><>##, 1, #<>##, 1, #<>## | |
| #<>#, 1, #<>#, #<今>#, 0, <日>, 1, <助詞><>##, 1, #<>##, 1, #<>## | |
| #<>#, 1, #<>#, #<今>#, 0, <日>, 1, <助詞><>##, 1, #<>##, 1, #<>## | |
| #<>#, 1, #<>#, #<今>#, 0, <日>, 1, <動詞><>##, 1, #<>##, 1, #<>## | |
| #<>#, 1, #<>#, #<今>#, 0, <日>, 1, <名詞><>##, 1, #<>##, 1, #<>## | |
| #<>#, 1, #<>#, #<今>#, 0, <日>, 1, <助詞><>##, 1, #<>##, 1, #<>## | |
| #<>#, 1, #<>#, #<今>#, 0, <日>, 1, <動詞><>##, 1, #<>##, 1, #<>## | |

FIG. 11(A)

| $c_{i-N+1}$ | $d_{i-N+1}$ | $t_{i-N+1}$ | $c_{i-N+2}$ | $d_{i-N+2}$ | $t_{i-N+2}$ | ... | ... | $c_i$ | $d_i$ | $t_i$ | $p(e_i)$ |
|---|---|---|---|---|---|---|---|---|---|---|---|
| | | | | | | | | | | | |

| $e_{i-N+1}$ | | | $e_{i-N+2}$ | | | | | $e_i$ | | | |

FIG. 11(B)

| $e_{i-2}, e_{i-1}, e_i$ | $p(e_i | e_{i-1}, e_{i-2})$ |
|---|---|
| <#,1,#><#,1,#><今,0,名詞> | 0.0034 |
| <#,1,#><#,1,#><今,0,助詞> | 0.0019 |
| <#,1,#><#,1,#><今,0,動詞> | 0.0064 |
| <#,1,#><#,1,#><今,1,名詞> | 0.0010 |
| <#,1,#><#,1,#><今,1,助詞> | 0.0017 |
| <#,1,#><#,1,#><今,1,動詞> | 0.0328 |
| <#,1,#><今,0,名詞><日,1,名詞> | 0.0047 |
| <#,1,#><今,1,名詞><日,0,名詞> | 0.0012 |
| <#,1,#><今,1,名詞><日,1,名詞> | 0.0277 |
| <#,1,#><今,0,名詞><日,1,助詞> | 0.0028 |
| <#,1,#><今,1,名詞><日,0,助詞> | 0.0018 |
| <#,1,#><今,1,名詞><日,1,助詞> | 0.0015 |
| <#,1,#><今,0,名詞><日,1,動詞> | 0.0021 |
| <#,1,#><今,1,名詞><日,0,動詞> | 0.0028 |
| <#,1,#><今,1,名詞><日,1,動詞> | 0.0013 |
| <今,0,名詞><日,1,名詞><#,1,#> | 0.0042 |
| <今,1,名詞><日,0,名詞><#,1,#> | 0.0027 |
| <今,1,名詞><日,1,名詞><#,1,#> | 0.0512 |
| <今,0,名詞><日,1,助詞><#,1,#> | 0.0018 |
| <今,1,名詞><日,0,助詞><#,1,#> | 0.0049 |
| <今,1,名詞><日,1,助詞><#,1,#> | 0.0022 |
| <今,0,名詞><日,1,動詞><#,1,#> | 0.0010 |
| <今,1,名詞><日,0,動詞><#,1,#> | 0.0017 |
| <今,1,名詞><日,1,動詞><#,1,#> | 0.0037 |
| ⋮ | ⋮ |

FIG. 12

| $e_{-1}, e_0, \cdots e_4$ | p(W,T) |
|---|---|
| <今,0,名詞><日,1,名詞><#,1,#><#,1,#> | $0.159 \times 10^{-4}$ |
| <今,0,名詞><日,1,名詞><#,1,#><#,1,#> | $0.095 \times 10^{-4}$ |
| <今,0,名詞><日,1,名詞><#,1,#><#,1,#> | $0.071 \times 10^{-4}$ |
| <今,0,名詞><日,1,助詞><#,1,#><#,1,#> | |
| <今,0,助詞><日,1,助詞><#,1,#><#,1,#> | |
| <今,0,助詞><日,1,動詞><#,1,#><#,1,#> | |
| <今,0,動詞><日,1,名詞><#,1,#><#,1,#> | |
| <今,0,動詞><日,1,助詞><#,1,#><#,1,#> | |
| <今,0,動詞><日,1,動詞><#,1,#><#,1,#> | |

FIG. 14

| Technique | Open Test | | Closed Test | |
|---|---|---|---|---|
| | EDR | ADD | EDR | ADD |
| Char-Bound | 95.63 95.43 | 98.41 98.49 | 97.80 97.44 | 99.77 99.67 |
| Char-Tag | 95.91 95.64 | 98.59 98.63 | 98.25 97.88 | 99.97 99.82 |
| Word-Tag (Prior Art Method) | — | — | 95.65 91.78 | 99.52 99.27 |

FIG. 15

| Technique | Open Test | | Closed Test | |
|---|---|---|---|---|
| | EDR | ADD | EDR | ADD |
| Char-Tag | 94.13 93.87 | 96.94 96.97 | 97.42 97.06 | 99.77 99.61 |
| Word-Tag (Prior Art Method) | — | — | 92.55 88.80 | 97.82 97.52 |

FIG. 16

| Technique | EDR |
|---|---|
| Char-Bound | 3 Seconds |
| Char-Tag | 665 Seconds |

MORPHOLOGICAL ANALYSIS METHOD AND DEVICE AND JAPANESE LANGUAGE MORPHOLOGICAL ANALYSIS METHOD AND DEVICE

BACKGROUND OF THE INVENTION

1. Field of the Invention

The present invention relates to a method and device for morphological analysis of language text in electronic form without using a dictionary, by utilising morphological analysis, in particular a probabilistic technique.

2. Description of the Related Art

Morphological analysis processing is extremely important in language processing; also morphological analysis processing in Japanese language processing is extremely important for further processing such as syntactic analysis processing. In particular, with the spread of text composition using word processors and the spread of the Internet large amounts of Japanese language text in electronic form can be easily acquired. In order to perform processing such as lookup, composition, comparison, categorisation, and summarisation of such texts with word processors or other computer devices, an overriding precondition is to be able to pick out semantic units such as words or phrases in the text, in other words, to be able to perform morphological analysis correctly. If this morphological analysis is incorrect, it is difficult for the error to be corrected in subsequent processing such as syntactic analysis processing or semantic analysis processing. Even if such correction is possible, processing is made more complicated, so it becomes impossible to process a large quantity of text within the expected time. In morphological analysis processing, compared with language texts such as English which have an orthography in which a space is employed as a word division symbol, in languages such as Japanese that have no word division, how to achieve inference of parts of speech and word division with high accuracy and high speed constitutes a considerable challenge.

The same problem as described above is found in languages such as Korean, Chinese and Thai that, like Japanese, have an orthography with no word division.

In techniques for morphological analysis of English, in which words are separated by word separators (spaces) and it is sufficient simply to allocate a tag such as a part of speech to a word, a technique has been established of inferring from a large text a probabilistic model of parts of speech or tag sequences representing the arrangement thereof and, further, of correcting errors using examples. In regard to the Japanese language also, there are several examples of proposals for applying this technique which is used in English. An example using a probabilistic model is proposed in "Japanese Language Letter Recognition Method and Device" which is proposed in reference I: "TOKKAIHEI, i.e. Japanese Unexamined Patent Publication No. 8-315078" which was applied for by NTT.

As already known, in order to find an optimum morphological analysis result by a probabilistic model, a morpheme sequence and tag sequence may be found such as to maximise the joint probability of the morpheme sequence and the tag sequence attached to each morpheme. The joint probability means the probability that a given candidate morpheme and candidate tag sequence occur simultaneously. In English, since the word separators are known, the morpheme sequences are fixed, so an optimum tag sequence can be inferred. However, in languages such as Japanese, or Korean, Chinese or Thai in which no word divisions are made in writing the word separations are not clear, so there is no alternative to comparing the probability of word sequences at all possible word separations. However, since respective word sequences have different word sequence lengths depending on different ways in which this word division is effected, a condition regarding length is included as an approximation in order to compare these word sequences of different length.

A simple description of this point is given below taking the Japanese language as an example. Morphological analysis consists in finding, for a given input text, the optimum morpheme sequence W and tag sequence T for the input character sequence. This can be achieved by selecting a chain probability model in which the joint probability p(W, T) of the morpheme sequence W and tag sequence T is maximised. In general, the chain probability model of expression (1) below is employed (see reference I). The chain probability means the probability that a given n (where n is an arbitrary number) of characters appear consecutively.

$$P(W, T) = \prod_{i=1}^{length(W)} p(w_i | t_i) p(t_i | t_{i-1}, t_{i-2} \ldots t_{i-N+1}) \quad (1)$$

where i is the char position, $w_i$ is the morpheme at character position i in the morpheme sequence, $t_i$ is the tag at the character position i in the tag sequence, and N is the number of characters in the character group that is referenced: usually, N=1 or 2 or 3. Length (W) is the length of the input word sequence i.e. is the number of words constituting the input text.

The chain probability model expressed by this expression (1) is referred to hereinbelow as the part of speech N-gram model. Since in this expression (1) a condition based on the length, length (W) of the input morpheme sequence is included, strictly speaking, an approximation regarding length (W) is included in p(W,T) of expression (1). In the case of English, since the length of a morpheme sequence is fixed, there are no problems when finding the maximum probability p(W,T). However, in the case of Japanese, since the morpheme separators are not known, it is necessary to obtain a morpheme network (constituting a semi-ordered relationship) using the character sequence of the input text and a dictionary and then to calculate the probabilities of all paths in this semi-ordered structure using a part of speech N-gram model. When this is done, in the case of Japanese, since the morpheme separators are not given, it is necessary to compare the probabilities of morpheme sequences of different length (length (W)). As a result, in expression (1) whereby approximation is effected with a probability conditioned by length, which gives no problems in the case of English, in the case of Japanese, one more approximation stage is required. That is, in contrast to what is the case with English, in the case of Japanese, the chain probabilities in respect of all possible candidates are not compared under the same conditions.

By the approximation, morpheme sequences for which the number of divisions is fewest (the morphemes are longer) are prioritised. The reason for this is that, since the number of possible sequences is greater for longer sequences, the average chain probability for a single possibility becomes smaller.

Furthermore, if, because the input character sequence is an unknown word, this character sequence is not present in the dictionary, a fresh problem arises in the probabilistic model analysis technique. In the case of English, no special improvement of the probabilistic model is required since it suffices, even in the case of an unknown word, simply to consider all possible tags for this unknown word. Also, since the number of possible tags is comparatively few (a few tens) the part of speech can be correctly deduced with considerable accuracy. However, in the case of an unknown word in Japanese, it is necessary to consider all possible positions of the character series constituting the unknown word (i.e. at which position should it be divided?), all possible lengths (i.e. what is the character structure of the word?) and all possible combinations in regard to the respective morphemes, so this represents an amount of calculation that cannot be implemented with a simple probabilistic model.

Also, if an unknown word is present, the dictionary cannot be used, so a semi-ordered structure cannot be obtained.

With the technique disclosed in reference I, unknown words are dealt with by introducing a word model using the chain probability of characters in respect of unknown words. However, with this technique, only the chain probability within the word is employed; how probable this word is in the light of the preceding and following context can be represented only indirectly by chain probability of parts of speech. That is, it is not possible to recognise or divide up correctly unknown character sequences without using the chain probability (in a character sequence going beyond the range of the unknown character sequence) of the entire context.

Also, since this prior art technique is solely a word-based technique, if the morphological analysis system provisionally concludes that there is an unknown word, combinations of candidate words of arbitrary length must be considered at all locations in the text: this therefore increases the amount of computation.

The problems described above will be summarised as follows:

1) Since the morphological analysis technique disclosed in the reference is word-based, in the case of Japanese, a dictionary is indispensable. However, even if a dictionary is provided, if an unknown word is present, the dictionary cannot be used, so word division is affected.

2) In the case of Japanese, owing to the ambiguity of word division, the probabilistic model used in the case of English, in which the number of divided words is fixed, cannot be applied without modification. For example, if two modes of division giving different numbers of divided words are compared, the mode of division that involves fewer divisions i.e. that produces the longest words will tend to obtain a significant evaluation value.

3) Due to the above problem 1), the following fresh problem is created as regards processing efficiency. This is that, with the prior art method, since it is word-based, a dictionary is indispensable merely in order to divide up the words. The troublesome task of compiling a dictionary is therefore essential and resources to store this dictionary are also required. Furthermore, during execution of processing, there is a large memory requirement and processing time is prolonged by referring to the dictionary.

Accordingly, there was previously a demand for realisation of a method and device for morphological analysis and a method and device for morphological analysis of Japanese wherein, even though a probabilistic technique is employed, use of a dictionary is not needed and morphological analysis processing can be achieved with high accuracy and high speed without the probability calculation depending on the number of words into which division is effected and yet in which economies in regard to resources are possible.

SUMMARY OF THE INVENTION

Accordingly, the inventors of the present application carried out various studies and experiments, as a result of which they arrived at the belief that the various problems described above could be solved by performing Japanese-language morphological analysis based on characters rather than on words. The reasons for this were as follows. Specifically, describing Japanese as an example, the number of Japanese characters that are generally used is 3000–6000, and, unlike English, the characters themselves carry an appreciable amount of information. Their variety is of a magnitude such that a probability model is within the capability of current calculating facilities. For this reason, since, if characters are used as a base, the requirement for a dictionary is eliminated, a solution to problem 1) above can be sought and also, since the length of a character within one paragraph (i.e. a unit character sequence separated by indent characters) is fixed, the problem of 2) above can be solved, and, if 1) and 2) can be solved, necessarily the problem of 3) can also be solved.

Consequently, in a morphological analysis method and device and/or Japanese language morphological analysis method and device according to the present invention, basically, when performing morphological analysis based on characters, when a language text, for example a Japanese language text is given as input text, a row of word sequences as word sequences constituting this input text is output that appears most likely from all the combinations of whether or not a word boundary exists immediately after each character.

To achieve this, with a method of morphological analysis and a method of morphological analysis of Japanese according to the present invention, processing is performed including the following steps. Specifically:

step (a): reading as input text a language text, for example a Japanese language text;

step (b): for each character of an input character sequence of the input text that is read, forming an expanded character by addition of expansion information including at least word division information, and generating as candidates all expanded character sequences relating to this input character sequence, using the expanded characters that are thus formed;

step (c): finding as candidates the chain probabilities of all these expanded character sequences that are generated;

step (d): finding the chain probability having a maximum value from among the candidate chain probabilities obtained and selecting from the candidates as optimum expanded character sequence the expanded character sequence that gives this maximum chain probability; and step (e): then, in this step, outputting, as the morphological analysis result, the result of analysis including a row of word sequences determined by these optimum expanded character sequences.

Also, a device for implementing these methods comprises the following structural items:

(a) an expanded character generating section that can read a language text, for example a Japanese-language text, as input text and that, for each character of an input character sequence of this input text, forms an expanded character by appending expansion information including at least word division information and that forms as candidates all expanded character sequences relating to the input character sequence described above using the thus-formed expanded characters;

(b) a chain probability calculating section that finds as candidates the chain probabilities of all the expanded character sequences that are generated; and (c) an optimum path searching section that finds a maximum value chain probability from the candidate chain probabilities obtained and that selects as optimum expanded character sequence an expanded character sequence that gives this maximum chain probability, and that outputs as morphological analysis result an analysis result including a row of word sequences corresponding to such optimum expanded character sequences.

As will be explained in detail later, an expanded character, in contrast to an ordinary character, means a character including in the character information other than the character such as part of speech and or the word division of the character.

Since, with such a construction of the method and device, the technique is adopted of performing probability calculation using characters as a base rather than a word base, the following advantages are obtained.

Since the length of a character within a single text is fixed, the number of divisions cannot affect the calculation of probability so word division processing can be performed with greater accuracy than conventionally.

Also, since a dictionary is not required for morphological analysis processing, the troublesome and complex operation of compiling a dictionary etc. is not required, so morphological analysis processing of higher speed than hitherto can be aimed at.

Furthermore, since the chain probabilities of the expanded characters provide a general word model of words in Japanese etc. morphological analysis of unknown words can be conducted with greater accuracy than the prior art method of using a dictionary.

Furthermore, since a dictionary is not required, morphological analysis with word division information only can be conducted even without using tag information such as parts of speech. If this is done, processing can be performed with higher speed and greater economy of resources.

In putting the present invention into practice, preferably, an input character sequence may be formed with addition of control characters at the beginning of each sentence in the text and at the end of each sentence in the text of the input text. If this is done, the lengths of partial expanded character sequences (to be described) can be aligned for all characters, so probability calculation can be achieved more accurately and the accuracy of morphological analysis can thereby be raised.

Furthermore, in putting the present invention into practice, if, apart from word division information, there is added as expansion information tag information morphological analysis can be achieved with greater accuracy than conventionally not just in regard to word division but also in regard to parts of speech etc.

Also if apart from word division information and/or tag information arbitrarily selectable information is added to the expansion information, morphological analysis also in respect of arbitrarily selectable information such as "reading" and "conjugation" etc. can be achieved with greater accuracy and speed.

Also, in putting the present invention into practice, preferably the word division information is in binary form. Since the word division information is information as to which of two conditions obtains i.e. whether a morphemic division is/is not generated immediately after the character to which this is attached, as information to indicate this there may be employed binary information (normally "1" and "0"), which is generally used in the computer processing field. In the case of binary information handling is simple and easy so the construction of the device can be simplified and higher speed morphological analysis processing can be achieved.

In addition, in putting the present invention into practice, preferably the following substep processes may be included:

in step (a), a substep of reading the input text into buffer memory, where it is freely stored;

in step (b), a substep of reading the input character sequence from the buffer memory and a substep of reading the expanded character sequence into a first memory region where it is freely stored; and in step (c), a substep of finding by previous learning the corresponding partial chain probabilities of respective partial expanded character sequences comprising a fixed number of characters in order and constituting the expanded character sequences, reading these into a second memory region where they are freely stored; a substep of, for each respective expanded character sequence read from the first memory region, reading from the second memory region mentioned above all the partial chain probabilities constituting the expanded character sequence and respectively finding their product as the chain probability referred to above; and a substep of reading these chain probabilities into a third memory region where they are freely stored.

In executing these substeps, in a device according to the present invention, apart from the provision of the buffer member, first memory region, second memory region and third memory region referred to above, there may be provided a calculating stage that provides the chain probability by calculating the product of the partial chain probabilities that are read to a chain probability calculating section.

With such a construction, morphological analysis processing can be performed rapidly and by a simple construction.

BRIEF DESCRIPTION OF THE DRAWINGS

The foregoing and other objects, features and advantages of the present invention will be better understood from the following description taken in connection with accompanying drawings, in which:

FIGS. 4(A) and 4(D) are diagrams showing the content of a buffer for explanation of the content of data stored in a buffer memory employed in a device according to the present invention; 4(A) shows the buffer content according to a first embodiment and 4(B) shows the buffer content in a second embodiment;

FIGS. 7(A) and 7(B) are diagrams of a score table in a first embodiment of the present invention; 7(A) is a diagram showing an example of a score table in a first embodiment and 7(B) is a diagram showing an example of the content of this score table;

FIGS. 8(A) and 8(B) are diagrams of an expanded character table that is referred to in a first embodiment of the present invention; 8(A) is a view showing an example of an expanded character table in a first embodiment and 8(B) is a view showing an example of the content of this expanded character table;

FIG. 9 is a view given in explanation of the content of a score table after completion of process S4 in a first embodiment of the present invention;

FIGS. 10(A) and 10(B) are diagrams of a score table in a second embodiment of the present invention; 10(A) is a view showing an example of a score table in a second embodiment and 10(B) is a view showing an example of the content of this score table;

FIGS. 11(A) and 11(B) are views given in explanation of an expanded character table that is referenced in a second embodiment of the present invention; 11(A) is a view showing an example of an expanded character table in a second embodiment and 11(B) is a view showing an example of the content of this expanded character table;

FIG. 12 is a diagram given in explanation of the content of a score table after completion of process S4 in a second embodiment of the present invention;

FIG. 14 is a view showing performance evaluation of word division of a method and device for morphological analysis of Japanese according to the present invention;

FIG. 15 is a view showing performance evaluation of division of parts of speech of a method and device for morphological analysis of Japanese according to the present invention; and FIG. 16 is a view given in explanation of the time for execution of processing for morphological analysis of Japanese according to the present invention.

DESCRIPTION OF THE PREFERRED EMBODIMENTS

Figure 1:
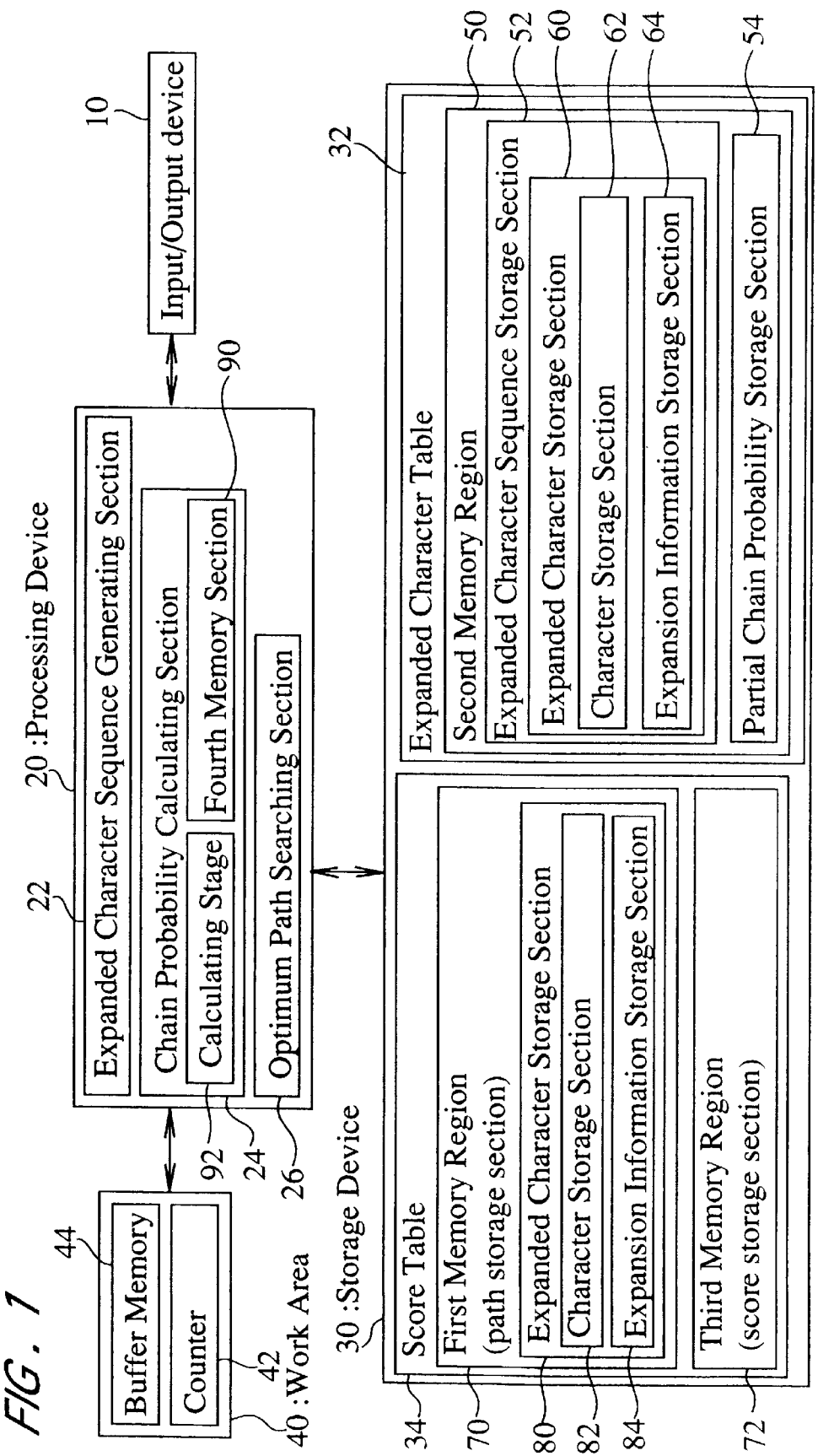
FIG. 1 is a block diagram of an example of a device layout given in explanation of a method and device for Japanese language morphological analysis according to the present invention.

Embodiments of the present invention are described below with reference to the drawings. Prior to reading of following descriptions, it should be noted that some information used for explaining following embodiments are mentioned with Japanese letters in FIGS. 4(A) and 4(B), FIG. 7(B), FIG. 8(A), FIG. 9, FIGS. 10(A) and 10(B), and FIG. 12. In addition to these, in the following description, Roman letters or English letters are used. In order to make clear the relation between Japanese letters and Roman or English letters, equivalent expressions in Roman or in English to Japanese letter are listed in Table 1 which should be referred.

In the embodiments, Japanese is taken as an example, but they could be applied to languages which, like Japanese, have an orthography with no word divisions, such as Korean, Chinese or Thai. First of all, a brief description of matters which are necessary for the explanation of the present invention will be given.

In the present invention, in order to seek a solution of the prior art problem described above, instead of using a N-gram model of parts of speech constituting morphemic units, a time-series model of expanded character units is employed. Definitions of a time series model of expanded character units and the most basic expanded characters (when simply finding word divisions without appending tags) are given by expressions (2)–(3) below. Several variations of expanded characters may be considered, depending on what sort of expanded characters are employed.

$$p(W, T) = \prod_{i=1}^{n+N-1} p(e_i | e_{i-1} e_{i-2} \ldots e_{i-N+1}) \quad (2)$$

$$e_i = \langle c_i, d_i \rangle \quad (3)$$

The expanded character unit time-series model finds the chain probability $p(W,T)$ of an expanded character sequence using the chain probability (also called the partial chain probability) of expanded character $e_i$. n is the length of input characters, N is the N of the N-gram i.e. the length of the set of characters that is referenced in order to find the optimum solution (number of characters constituting the character set) and $e_i$ is an expanded character found from the information of morpheme sequence W and tag T.

The expanded character $e_i$ when $i<1$ and $i>n$ is a special expanded character representing the beginning of each sentence in a text or the end of each sentence in a text.

As already described, an expanded character $e_i$ in contrast to ordinary characters such as "kare" or "ha", is a character including information other than characters such as word division or part of speech (see Table 1). The $c_i$ constituting expanded character $e_i$ of expression (3) is the character at position i of the input characters and $d_i$ is the division information before or after character $c_i$. For example, a straight-forward method is to use for division information taking a binary value and indicating whether or not a morphemic division is effected before or after position i of character $c_i$. Specifically, if division is effected, this may be indicated by making $d_i=0$ and if division is not to be effected, this may be indicated by making $d_i=1$.

In the description below, a model using expanded characters $e_i$ having information concerned solely with division is termed a "character boundary model"; for example, the expanded character $e_i$ of "kare" is expressed as<kare, 0>(see Table 1).

In the case of morphological analysis of Japanese, word division is essential, so information regarding word division is fundamental and is indispensable even in the case of a method where tag information such as parts of speech is included. The use of such division information and character combinations constitutes a decisive difference from the conventional morphological analysis technique using word-level information.

Such an expanded character $e_i$ may also contain tag information and is represented by the following expression (4).

$$e_i = \langle c_i, d_i, t_{f(i)} \rangle \quad (4)$$

In this expression (4), f(i) is a function that converts the position i of a character $c_i$ in an input character sequence into the number of the morpheme (morpheme position) containing this position. Here, expanded character $e_i$ represents the result obtained by adding to expanded character $e_i$ in the character boundary model described above a morpheme tag containing this character $c_i$ in morpheme sequence W and tag sequence T. This model is called the character tag model. As the tag information, apart from "part of speech", "reading information" and/or "conjugation" etc. may be considered, but it can also be arranged to obtain the morphological analysis result relating to this information not just by such tag information but by adding any desired number of items of information such as for example "reading" information. In an example in which part of speech is added, the expanded character $e_i$ of "kare" may be represented as <kare, 0, pronoun>(see Table 1).

Based on the above premises, embodiments of the present invention will be described taking by way of example two models, namely, the character boundary model and the character tag model.

First of all, structural conditions common to the two models will be described with reference to FIG. 1.

FIG. 1 is a block diagram showing an example of the construction of a Japanese-language morphological analysis device according to the present invention. This device chiefly comprises an input/output device 10, processing device 20, storage device 30, and work area 40, and is constituted using the hardware resources of a computer. The necessary functions for effecting drive, such as for example control sections that control these devices are therefore of course provided.

Input/output device 10 is a device for inputting required information from outside to this device; it may be constituted by any suitable desired means such as an ordinary keyboard, mouse, OCR or voice input device, or may be constituted as means for receiving communication signals from outside. Also, the output section, just as in the case of an ordinary computer device, has a construction enabling output of the required information of the results obtained by this device to various external display means and/or communication reception means etc.

Processing device 20 chiefly comprises an expanded character sequence generating section 22, chain probability calculating section 24, and optimum path searching section 26.

Expanded character sequence generating section 22 reads as input text a Japanese-language text in electronic form and forms expanded characters by adding to each character of the input character sequence of this input text expansion information including at least word division information and, using these expanded characters, generates all the expanded character sequences relating to the input character sequence. Specifically, expanded character sequence generating section 22 generates all expanded character sequences from the text that is input from input/output device 10.

Chain probability calculating section 24 finds the chain probabilities of all the expanded character sequences that are thus generated.

Also, optimum path searching section 26 selects as the optimum expanded character sequence the expanded character sequence that gives the maximum value of the chain probability from the chain probabilities that are obtained, and outputs as the morphological analysis result an analysis result containing a row of word sequences corresponding to this optimum expanded character sequence. Alternatively, instead of just the expanded character sequence that gives the maximum value of the chain probability, it could be arranged to output successively corresponding expanded character sequences in order of diminishing probability.

Storage device 30 chiefly comprises an expanded character table 32 and score table 34.

This expanded character table 32 is a table that stores expanded character sequences $e_i\, e_{i-1}\, e_{i-2}\, \ldots\, e_{i-N+1}$ and their chain probabilities (partial chain probabilities) $p(e_i|e_{i-1}\, e_{i-2}\, \ldots\, e_{i-N+1})$; it comprises a second memory region 50 constituting an expanded character sequence storage section 52 and partial chain probability storage section 54. This expanded character table 32 is referenced by a chain probability calculating section 24 when the chain probabilities described above are found.

Expanded character sequence storage section 52 comprises N expanded character storage sections 60. Also, expanded character storage section 60 comprises a character storage section 62 and a storage section (called expansion information storage section) 64 for expansion information including division information. Characters $c_i$ are stored in character storage section 62 and expansion information such as division information $d_i$ and/or tag information $t_i$ of characters $c_i$ is stored in expansion information storage section 64, respectively.

Score table 34 is a table that stores all expanded character sequence paths [W,T] from the beginning of the sentence to its end and that stores their joint probability (chain probability) p(W,T); it comprises a first memory region constituting a path storage section 70 and a third memory region constituting a score storage section 72. Path storage section 70, just like expanded character storage section 60, comprises n(n is the number of characters of the text that is read in) expanded character storage sections 80; these expanded character storage sections 80 comprise a character storage section 82 and an expansion information storage section 84 that stores the expansion information including division information. In this path storage section 70, there are stored all the expanded character sequences generated by expanded character sequence generating section 22. Also, in score storage section 72, there are stored all the chain probabilities obtained by calculation by chain probability calculating section 24.

Work area 40 is an area for performing various types of processing by processing device 20 and comprises a counter 42 and buffer memory 44.

Figure 2:
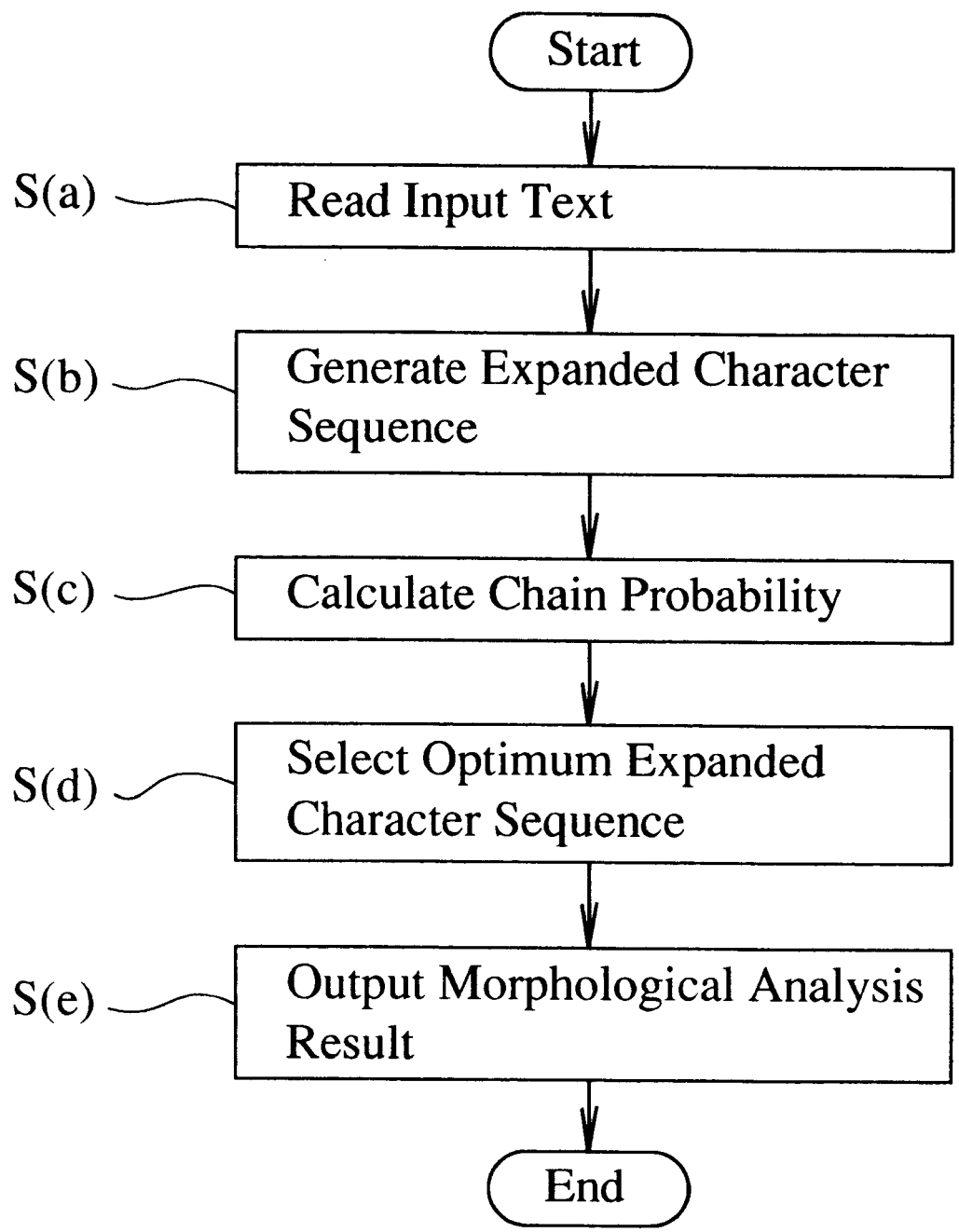
FIG. 2 is a basic flow chart of processing for execution of a method of Japanese language morphological analysis according to the present invention.

The following processing steps can be executed in accordance with the present invention by means of such a construction. FIG. 2 shows a flow chart of this processing. In the Figures, steps are indicated by the symbol S.

First of all, in S(a), a Japanese-language text is read as input text by input/output device 10. In this case, preferably, the input text that is read is freely stored by reading into buffer memory 44.

Next, in S(b), for each character of the input character sequence of this input text, an expanded character is formed by adding expansion information including at least word division information, and all the expanded character sequences relating to the input character sequence are generated using the expanded characters that are thus formed. To achieve this, preferably addition of expanded characters is performed by reading the input text from buffer memory 44 into expanded character sequence generating section 22. The expanded character sequences that are thus generated are read into the first memory section constituting path storage section 70, where they are freely stored.

Next, in S(c), the chain probabilities of all the expanded character sequences that have been generated are found. To achieve this, preferably, in this calculation, the partial chain probabilities respectively corresponding to the partial expanded character sequences consisting of sequential fixed numbers constituting the expanded character sequence i.e. a number (N) (normally, N=1 or 2 or 3) of character sets referenced when this calculation is performed are found by learning (training) beforehand, and these partial chain probabilities are read into a second memory region constituting expanded character table 32, where they are freely stored. Then, for each respective expanded character sequence that is read from first memory region 70, all the partial chain probabilities constituting these expanded character sequences are read from this second memory region 50, their products are calculated, and found as the chain probability. The chain probabilities obtained are read into a third memory region constituting score storage section 72, where they are freely stored.

Next, in S(d), from the chain probabilities that have been obtained, the expanded character sequence that gives the maximum value of the chain probability is selected as the optimum expanded character sequence. This selection is preferably made by comparing the probabilities of the expanded character sequences stored in third memory region 72.

Then, in S(e), the analysis result including a row of word sequences determined by optimum expanded character sequence is output as the morphological analysis result. When this is done, if required, the expanded character sequence corresponding to the chain probability of next-highest magnitude is output following this sequence of greatest probability.

[1] First Embodiment

This embodiment describes a case where the expansion information that is employed consists solely of word division information.

Figure 3:
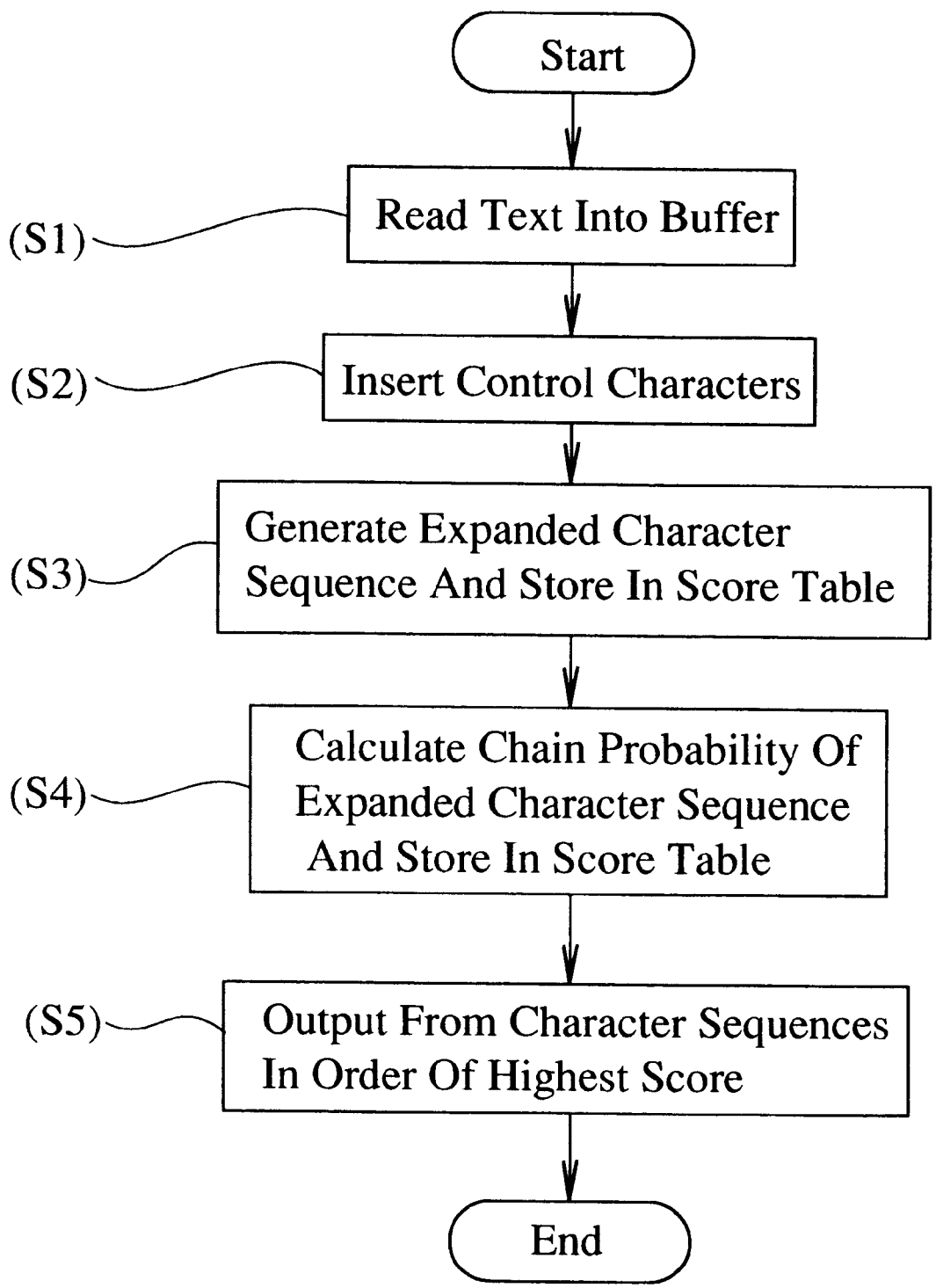
FIG. 3 is a flow chart of processing given in explanation of an embodiment of the present invention.

FIG. 3 is a flow chart given in explanation of the flow of processing in this first embodiment of the present invention. In this embodiment, morphological analysis is conducted on input units constituted by a character sequence of one paragraph, in other words, a unit marked off by the indent character. Also, processing flow will be described using the partial chain probabilities of three characters (N=3), taking as an example a case where "kyoo wa" (input character length n=3) is input (see Table 1).

In the following description, in the diagram of the expanded character table and score table of the example, the character storage section and expansion information storage section are represented as $<c_i, d_i>$.

When operation of the morphological analysis device is commenced, the character text "kyoo wa" of the text from input/output device 10 is input in response to a read instruction from the control section (not shown) of the device, and is read into buffer memory 44 (S1).

Next, at the head and at the end of the text that is read in, under the control of instructions from expanded character sequence generating section 22, (N−1) control characters are inserted at the head $c_{-(N-1)+1}, \ldots c_0$, and at the end $c_{n+1}, \ldots c_{n+(N-1)}$. (S2). In this example, since N=3, at the head and the end there are respectively inserted two control characters, namely, $c_{-1}$, $c_0$ and $c_4$, $c_5$. These control characters are represented by the symbol #. FIG. 4(A) shows an example of the content of buffer memory 44 after insertion of these control characters. In this example, the specific characters: #, #, "ima", "hi", "wa", #, # corresponding to the character position order of characters $c_{-1}$, $c_0$, ... $C_5$ are stored in a mutually corresponding vertical relationship (see Table 1).

It should be noted that insertion of such control characters is a well known technique for finding N-gram chain probabilities. Since the control characters are special characters indicating the beginning of each sentence in the text and the end of each sentence in the text, characters such as symbols are employed which can be distinguished from the text (main text). Regarding insertion of these control characters, control characters are stored beforehand in a desired memory region and, when the input text is read into buffer memory, they may be automatically inserted, or may be inserted in response to an instruction from outside. Also, the reasons for insertion of these control characters are as described below. Normally, in order to infer the probability of occurrence of a i-th character $c_i$, the inference probability of the (i−1)-th character from the (i−N+1)-th character is necessary. However, when i is smaller than N, the value of i is minus, so the probability of occurrence of a character that does not exist is being sought to be obtained. Accordingly, for convenience, (N−1) characters are inserted, so that, even if i is smaller than N, a control character # is inserted in order to make it possible to infer the probability of occurrence of character $c_i$.

Next, all the possible expansion character sequences are generated from the text that is read in, and these are stored in path storage section 70 of score table 34 (S3). The details of this generation process S3 are shown in FIG. 5.

Figure 5:
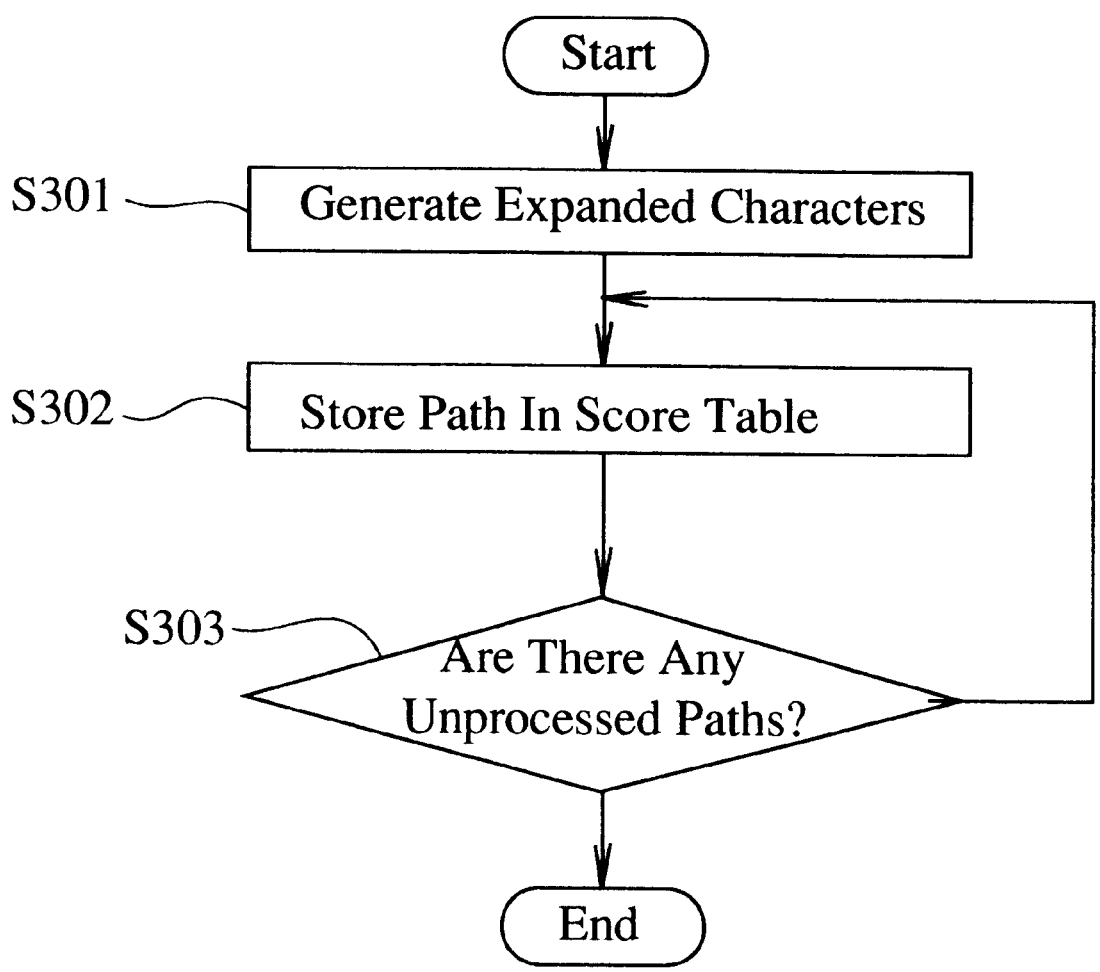
FIG. 5 is a flow chart of generation of an expanded character sequence given in explanation of the present invention.

FIG. 5 is a flow chart of expanded character sequence generation. Expanded character sequence generating section 22 reads characters $c_i$ sequentially from buffer memory 44 in response to a termination signal of the control character insertion processing described above, and generates expanded characters obtained by combining all the word division information $d_i$ for each character $c_i$ (S301). Various methods may be considered for representing the division information; however, in this case, a system is selected whereby $d_i=1$ if morpheme division is effected immediately following character position i and otherwise $d_i$32 0; this is therefore a binary system in which the word division information $d_i$ can take two values: "0" or "1".

In this case, the expanded characters <#,0>, <#,0>, <ima, 0>, <hi,0>, <wa,0>, <#,0>, <#,0> etc. and <#,1>, <#,1>, <ima,1>, <hi,1>, <wa,1>, <#,1>, <#,1> etc. are formed (see Table 1). The character portions of these expanded characters $c_i$ are stored in character storage section 62 and the word division information $d_i$ is stored in expansion information storage section 64, in mutual correspondence.

Then, the combination (path) of expanded characters from the sentence head to the sentence end is stored in score table 34 (S302). Examples of such paths are: path <#,0>→<#, 0>→<ima,0>→<hi,0>→<wa,0>→<#,0>→<#,0>, and the path: <#,1>→<#,1>→<ima,1>→<hi,1>→<wa,1>→<#, 1>→<#,1> (see Table 1).

Next, process S302 is repeated as long as there is any unprocessed path until all the paths are stored. When there is no unprocessed path processing is terminated.

It should be noted that in order to speed up processing, in process S302 it would be possible to arrange not to store in score table 34 expanded character sequences containing expanded characters that did not appear in the training corpus (text) for compilation of the expanded character table. This is because it may be assumed that, in a sufficiently large training corpus, all possible combinations of characters and parts of speech will appear, so any combinations of characters and parts of speech that do not appear can be neglected from the very beginning.

The results of the processing (S3) that are thus obtained are stored in score table 34 as expanded character sequences. FIG. 7(A) shows an example of a score table and FIG. 7(B) shows an example of the content of the score table. In FIG. 7(A), $e_{-(N-1)+1}, e_{-(N-1)+2}, \ldots, e_1, e_2, \ldots e_n, \ldots, e_{n+(N-1)}$ are recorded in order for all expanded character sequences, corresponding characters $c_{-(N-1)+1}, c_{-(N-1)+2}), \ldots, c_1, c_2, \ldots c_n, \ldots, c_{n+(N-1)}$ and expansion information (in this case, division information) $d_{-(N-1)+1}, d_{-(N-1)+2}, \ldots, d_1, d_2, \ldots d_n, \ldots, d_{n+(N-1)}$ being paired. The right-hand column is the column of the chain probability p(W,T). For the specific content of FIG. 7(B), the expanded character sequence $e_{-1}$, $e_2$, ... $e_5$ is shown in the left-hand column and all the expanded character sequences when the input text is "kyoo wa" are arranged in order from top to bottom as candidates. A column showing the chain probability p(W,T) is provided on the right. In this case, the chain probability column is empty. Using the symbol "/" to indicate division, for example the data in the second line in the Figure indicates the expanded character sequence when "/kyoo wa/" is one unit and the data in the fourth row indicates the expanded character sequence when this is divided as: "/kyoo/wa/" (see Table 1).

It should be noted that the data of this score table are stored in path storage section 70, expanded characters $e_i$ etc. are stored in expanded character storage section 80, characters $c_i$ etc. are stored in character storage section 82, and expansion information constituted by word division information $d_i$ etc. is stored in expansion information storage section 84, respectively.

In this way, when process S3 has been completed, processing advances to the next process (S4). In this process S4, expanded character table 32 is referenced and the chain probability of the candidate character sequence (each expanded character sequence) is calculated from score table 34, and stored in the score table.

FIG. 8(A) shows an example of the expanded character table 32 that is referenced. In this case, the expanded characters $e_{i-N+1}$, $e_{i-N+2}$, ... $e_i$ are recorded in order, the corresponding characters $c_{i-N+1}$, $c_{i-N+2}$, ... $c_i$ and the expansion information (in this case, division information) $d_{i-N+1}$, $d_{i-N+2}$, ... $d_i$ being paired. The right-hand column is the column of the partial chain probability $p(e_i)$ (also called the appearance probability). FIG. 8(B) is a view showing a specific example of the content of an expanded character table 32. In this example, the case where the number N of character sets is N=3 is shown, so, if character position is represented by i, the partial expanded character sequence of three characters $e_{i-2}$, $e_{i-1}$, $e_i$ is shown in the left-hand column of FIG. 8(B) and the chain probability of the corresponding partial expanded character sequence i.e. the partial chain probability $p(e_i|e_{i-1}, e_{i-2})$ (also called the appearance probability) is shown in the right-hand column.

With the content of this expanded character table shown in FIG. 8(B), turning to the data at for example the third line from the top, "<#,1> <ima,0> <hi,0>" indicates that, if the character sequence "# ima" is divided after the control character "#" at the head and is not divided after "ima", the probability that the next character is "hi" and division is not effected immediately after "hi" is "0.0134". The other data indicate probabilities in the same way (see Table 1).

Such an expanded character table is compiled by previous training (learning) and is stored in storage device 30. The text that is the subject of processing is held in storage device 30 using input/output device 10 and is read under the control of instructions from processing device 20. Referencing expanded character table 32 and reading/writing score table 34 can be executed from time to time by accessing storage device 30 from processing device 20. Also, if this expanded character table 32 contains a tagged corpus (in this case, a corpus in which word division is effected), the number of N-grams can easily be acquired by counting. It would also be possible for this to be acquired and compiled by using the output results of existing morphological analysis systems.

The data of this expanded character table are stored in expanded character sequence storage section 52, expanded characters $e_i$ etc. are stored in expanded character storage section 60, characters $c_i$ etc. are stored in character storage section 62, and the expansion information constituted by word division information $d_i$ etc. is stored in expansion information storage section 64, respectively.

Figure 6:
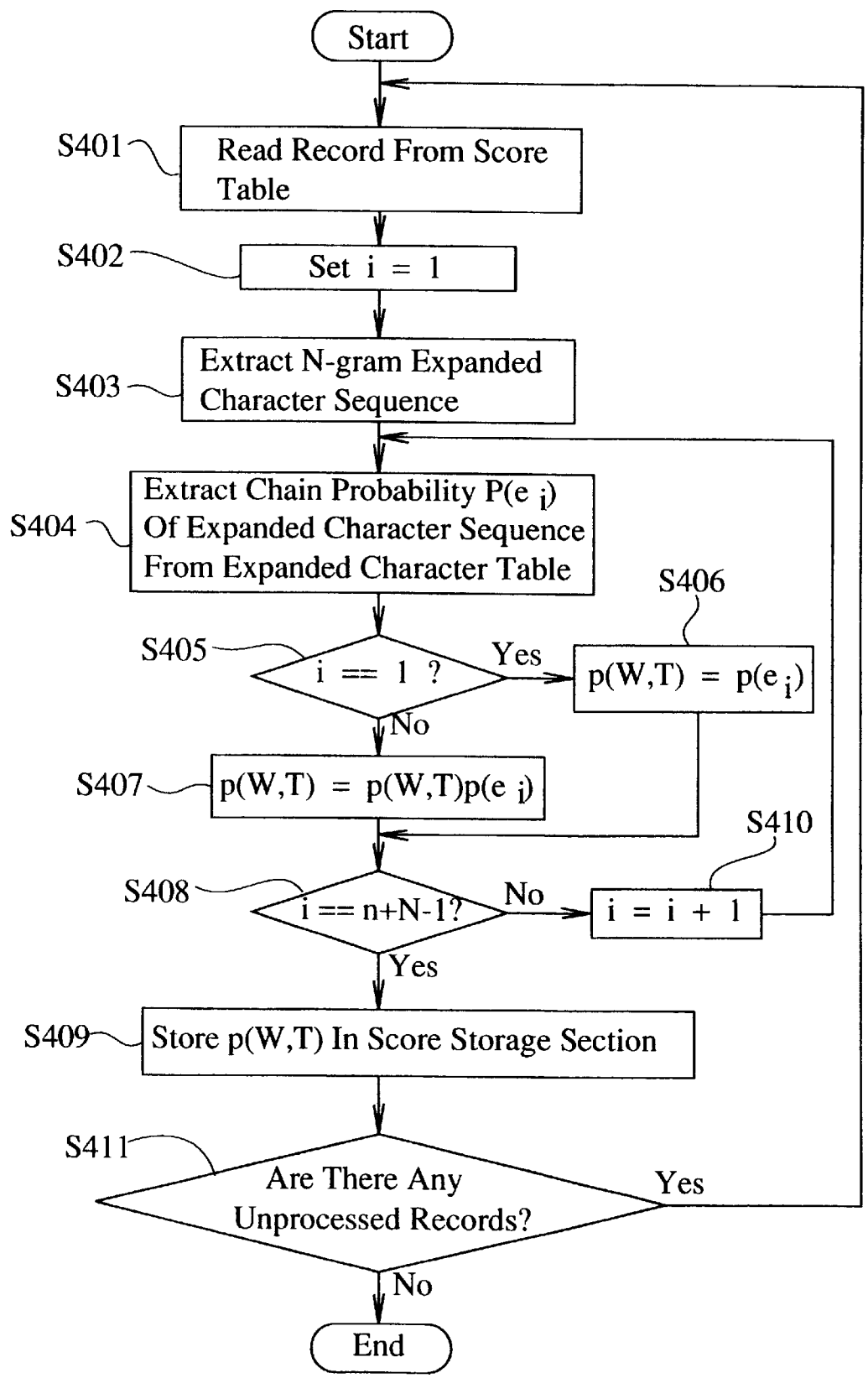
FIG. 6 is a flow chart of processing for calculating chain probability given in explanation of the present invention.

FIG. 6 shows a more detailed flow chart of the processing of this process (S4). This processing series is described below. It should be noted that all this processing is executed under the control of instructions of processing device 20.

Process S401: the record (data) of the first line is read from score table 34. To achieve this, the first-line data of score table 34 is read into buffer memory 44 of work area 40. At this point, counter 42 of work area 40 is read and displays the position i of the character that is being processed.

Process S402: next, i of counter 42 that shows the character position is set to the head of the text (i.e. i is made=1).

Process S403: next, the N-character expanded character sequence from $e_{i-N+}1$ to $e_i$ is fetched. The value of N can be chosen at will, but in this case N=3 is chosen. Consequently, in this process, a three-character expanded character sequence (partial expanded character sequence) from $e_{-1}$ to $e_1$, i.e. "<#,1> <#,1> <ima,0>" is fetched from buffer memory 44 (see Table 1).

Process S404: next, the chain probability of the fetched expanded character sequence (partial expanded character sequence) is found by referring to expanded character table 32. In performing the calculation of this chain probability, expression (2) already described is stored in the storage section of chain probability calculating section 24 i.e. in fourth memory region 90, and this expression (2) is read to calculating stage 92, where the calculation of expression (2) is executed.

According to the content of the expanded character table of FIG. 8(B), the partial chain probability $p(e_1|e_0 e_{-1})$ corresponding to "<#,1> <#,1> <ima,0>" is "0.0832", so this is fetched from the expanded character table and temporarily stored in fourth memory region 90 (see Table 1).

Processes 405–407: next, calculating stage 92 ascertains whether or not i==1 (on comparing i and 1, i is equal to 1) and, if i==1, this calculating stage 92 sets p(W,T) to $p(e_i|e_{i-} \ldots e_{-N+1})$ (S406). Specifically, in the present example, the value of this partial chain probability is substituted in expression (2) to obtain $p(e_1|e_0,e_1)$=0.0832.

In contrast, if i!=1 (i is not equal to 1), in accordance with expression (2), the product of p(W,T) and $p(e_i|e_{i-1} \ldots e_{i-N+1})$ is found, and is set to p(W,T) (S407).

Processes S408–410: next, a determination is made as to whether i==n+N−1; if i==n+N−1, p(W,T) is stored in score storage section 72 of score table 34 (S409). In this example, as described above, $p(e_i|e_0 e_{-1})$=0.0832 is stored. On the other hand, if i!=1, i is incremented by 1 (S410) and processing returns to S403.

Process S403: in this process, the three-character expanded character sequence (partial expanded character sequence) from e 1 to $e_2$ i.e. "<#,1> <ima,0> <hi,0>" is fetched from buffer memory 44 (see Table 1).

Process S404: next, the partial chain probability $p(e_2|e_1 e_0)$=0.0134 of "<#,1> <ima,0> <hi,0>" is found from expanded character table 32.

Processes S405–S407: next, a determination is made as to whether or not i==1 (S405); in this case, since i!=1, processing advances to S407. In this processing, in expression (2), in calculation stage 92, the product of the already-obtained p(W,T)=0.0832 and the presently-obtained $p(e_2|e_1e_0)=0.134$ is calculated and this is set as the new $p(W,T)$ (S407).

These processes S403–407 are repeated until i==5.

Process 408: when i==5, the chain probability $p(W,T)$ is stored in score storage section 72 of score table 34 (S409).

Process 411: The chain probabilities (also called joint probabilities) of all the expanded character sequences in score table 34 can be found by determining whether or not there are any unprocessed records and if there are any unprocessed records returning to process S401 and repeating the foregoing processing. When there are no unprocessed records, this process S4 terminates.

FIG. 9 shows the content of the score table after completion of process S4. In respect of each expanded character sequence shown in the left-hand column $e_{-1}, e_0, \ldots e_5$ of this Figure, the result found by chain probability calculation in accordance with expression (2) given above is respectively recorded as the value of $p(W,T)$ in the right-hand column corresponding to each sequence. The optimum expanded character sequence is inferred to represent the morpheme division that is most plausible, arrived at on the basis that larger values of this chain probability imply greater plausibility of the corresponding expanded character sequence. After this process S4 is completed, processing advances to the next process S5.

Process (S5): in this process, in optimum path searching section 26 of processing section 20, the chain probabilities stored in score storage section (third memory region) 72 are successively read and compared and their values are arranged in descending order from the maximum chain probability; the expanded character sequences corresponding to these chain probabilities are arranged in order of their magnitude (score order) and are output in sequence. Consequently, first of all, the character sequence to which the maximum chain probability has been assigned is deemed to be the character sequence in which the word divisions are optimum and this is output from the output section of input/output device 10. Since in this example the expansion information is solely constituted by word division information, it is output in the form of a word sequence. Next, if required, a row of word sequences successively corresponding to descending order of the score is output.

The flow of processing when this maximum chain probability is output will now be described with reference to FIG. 13. By repeating this processing in score order, a row of all the word sequences having a value above a given threshold value can also be output.

First of all, for the $e_{-(N-1)+1}, \ldots e_{n+(N-1)}$ having maximum chain probability $e_1, \ldots, e_n$ obtained by removing the beginnings $e_{-(N-1)+1}, \ldots, e_0$ and the ends $e_{n+1}, \ldots, e_{n+(N-1)}$ of the expanded character sequences of the control characters from the score table (corresponding to FIG. 9 in this first embodiment) in which are stored the chain probabilities found for all the expanded character sequences are read (S501). In this example of FIG. 9, these are $e_1, \ldots, e_5$, so the fourth line from the top, namely, <ima,0> <hi,1> <wa,1> is read.

At this point, counter 42 is set to j (S502), and buffer memory 44 is initialised (S503).

Next, a comparison is made of character position j of counter 42 and length n of the input characters (S504); if it is not equal to the length n, the value $c_j$ of $e_j=<c_j, e_j>$ is added to buffer memory 44 (S505). In the present example, the value "ima" of $c_i$ is added, so the buffer memory 44 in this condition becomes:

[ima](see Table 1).

Next, a determination is made as to whether the word division information $d_j$ is 1 or 0 (S506); if $d_j=1$, [word division symbol] is added (S507). It does not matter what symbol is used for this [word division symbol], but, in this case "_" (underline) is used.

It should be noted that if $d_j=0$, no action is taken. In this example $d_1=0$, so no action is taken.

Next, processing advances by incrementing the character position j of counter 42 by 1 (S508) and the same processing is repeated.

After process S508 at expanded character $e_2$ has been completed, $d_2$ is 1, so the word division symbol "_" is added, and the condition of buffer memory 44 then becomes:

[kyoo_] (see Table 1).

The character position j of counter 42 is then incremented by 1 (S508), and processing returns to the next process S504.

In S504, at $e_3$, j=n=3, so processing advances to process S509, and the value $c_n$ of $e_n=<c_n, d_m>$ is added to buffer memory 44 (S509). As a result, the condition of buffer memory 44 becomes: [kyoo_wa] (see Table 1).

Finally, the value stored in buffer memory 44 is output by input/output section 10, and this process is terminated.

In the first embodiment described above, the method of trying all paths was employed; however, as already described in connection with process S302, processing could be performed at higher speed by combining this with a search algorithm.

[2] Second Embodiment

Next, a second embodiment will be described. Whereas in the first embodiment only word division information was employed as the expansion information, this second embodiment differs in that, in this second embodiment, word division information together with tag information are employed as expansion information. The device structure and operation processing in respect of this are therefore a little different. In this second embodiment, not just morpheme unit division as in the case of the first embodiment, but also analysis results relating to any desired information stored in the expansion information storage section can be obtained. Specifically, if the tag information is chosen to be part of speech information, the part of speech of the divided character sequence can also be simultaneously inferred. The example below is described under the assumption that the tag information constitutes part of speech information.

Basically, the device construction in this case is the construction shown by the block diagram in FIG. 1. However, the construction of the expanded character table 32 and score table 34 is different from that of the first embodiment in the following respects.

The first respect is that, in the second embodiment, expansion information storage region 64 described above of expanded character table 32 comprises respective regions for storing word division information $d_i$ and tag information $t_i$. Consequently, expansion information storage section 64 comprises a word division information storage section (not shown) and a tag information storage section (not shown).

Consequently, in character storage section 62, characters $c_i$ are stored and in expansion information storage section 64 word division information $d_i$ and tag information $t_i$ are stored in separate storage sections.

The second respect is that expanded character storage section 80 described above of score table 34 has respective regions for storing word division information $d_i$ and tag information $t_i$. Expansion information storage section 84 therefore has a word division information storage section (not shown) and a tag information storage section (not shown). An example of a score table and expanded character table in this case are respectively shown in FIG. 10(A) and FIG. 11(A). In these Figures, the difference with respect to FIG. 7(A) and FIG. 8(A) that were described in the first embodiment is that, in the case of the score table of FIG. 10(A), character $c_i$, division information $d_i$ and tag information $t_i$ are added to respective expanded characters $e_i$ (i=1~N+1~n+N-1 (in this case, since N=3, i=-1~n+2)). Also, in the expanded character table of FIG. 11(A), likewise, character $c_i$, division information $d_i$ and tag information $t_i$ are added to respective expanded characters $e_i$ (i=1~N (in this case, N=3, so i=1–3)).

Next, the operation of this second embodiment will be described. The basic flow of processing in this case is as described with reference to FIG. 2. Also, since the operation of this second embodiment is basically the same as in the case of the processing flow in the first embodiment described in FIG. 3, it will now be described with reference to this FIG. 3.

In the description below, a specific description is given of the flow of processing using three-character partial chain probability (appearance probability), taking as example a case where the input text is "kyoo". In the diagram of the expanded character table 32 and score table 34 of the specific example, the content of character storage sections 62, 82 and expansion information storage sections 64, 84, i.e. the content of expanded character storage section 60 and 80 are represented as <$c_i$, $d_i$, $t_i$>.

Process (S1)–(S2): this is the same as in the case of the first embodiment. The content of buffer memory 44 after this processing is also as shown in FIG. 4(B).

Process (S3): from the text that is read, all possible expanded character sequences are generated, and these are stored in path storage section (first memory region) 70 of score table 34. In this case, the difference with respect to the first embodiment is that, to each character there are added, as expansion information, word division information and part of speech information. The control characters at the beginning of each sentence in the text and at the end of each sentence in the text are characters that are added for convenience in processing and so do not constitute expansion information; however, in this example, for convenience, as word division information "1" is added and, as part of speech information "#" is added. The content of the score table 34 that is obtained as a result is shown in FIG. 10(B). For example, in the first line of FIG. 10(B), an expanded character sequence is shown for the case where "kyoo" is not subjected to word division i.e. the character sequence "kyoo" is a single word and the part of speech is "noun" (see Table 1).

Process (S4): this processing is also carried out in the same way as in the case of the first embodiment. FIG. 11(B) shows an example of expanded character table 32 in the case of the second embodiment. In this Figure also, "#" of tag information storage section 64 constituting the expansion information storage section is a control character (symbol): for example, "<#,1,#> <ima,0, noun> <hi,1, noun>" at the seventh line from the top in FIG. 11(B) indicates that, if, the parts of speech of "#", "ima" and "hi" in the text are respectively control character, noun, noun, division is effected immediately after "#" and division is not effected immediately after "ima", then the probability of division being effected immediately after "hi" is 0.0047 (see Table 1).

Just as in the case of the first embodiment, this expanded character table 32 can easily be acquired if a corpus with part of speech tags is employed, by counting the number of N-grams.

Next, referring to FIG. 6, a specific description of the processing of process S401–411 is given for the second embodiment. This processing is performed in the same way as in the case of the first embodiment, so common processing etc. will be described only briefly.

Process S401: the record (data) of the first line from score table 34 of FIG. 10(B) is read into bottom memory 44.

Process S402: counter i indicating the character position is set to the head of the text.

Process S403: from buffer memory 44, a three-character expanded character sequence (partial expanded character sequence) from e_1 to $e_1$ i.e. "<#,1,#> <#,1,#> <ima,0, noun>" is fetched (see Table 1).

Process S404: in this process, by referring to expanded character table 32 of FIG. 11(B), the partial chain probability (appearance probability) $p(e_1|e_0e_2)=0.034$ of "<#,1,#> <#,1,#> <ima,0,noun>" is found (see Table 1).

Process S405–406: in this case, i==1, so chain probability p(W,T) is set=0.0034 and processing advances to process S408.

Process S408–410: i!=1, so processing returns to process 404 by incrementing i by 1.

Process S404: referring to the expansion table 32 of FIG. 11(B), the partial chain probability (appearance probability) $p(e_2|e_1e_0)=0.0047$ of "<#,1,#> <ima,0,noun> <hi,1,noun>" is found.

Step S405–406: at this point, i!=1, so the product of chain probability p(W,T) and $p(e_2|e_1e_0)$ is found by expression (2) (that is, chain probability p(W,T)=p(W,T)×$p(e_2|e_1e_0)$); that is, as a result, p(W,T)=0.0034×0.0047=0.159×10$^{-4}$ is set to p(W,T).

Step 408–409: i==n (n==2), so p(W,T) is stored in score storage section (third memory region) 72 of score table 34.

Process S411: there is an unprocessed record, so processing returns to process S401.

By repeating the above processing, the chain probability (joint probability) of all the expanded characters in score table 34 can be found.

FIG. 12 is an example showing the content of score table 34 after completion of process S4. In this case also, the plausibility of the inferred morpheme division of a character sequence is a maximum if the magnitude of the chain probability of the expanded character sequence is greatest. For example, if the chain probability of the first line: "<#,1,#> <#,1,#> <ima,0,noun> <hi,1,noun> <#,1,#> <#,1,#>" largest, this is deemed to be the optimum expanded character sequence (see Table 1).

Process (S5): after completion of the series of processes S4, in the same way as in the case of the first embodiment, optimum path searching section 26 outputs a row of word sequences and a row of tag sequences determined by the expanded character sequence corresponding to descending order of chain probability (score) from score table 34.

Figure 13:
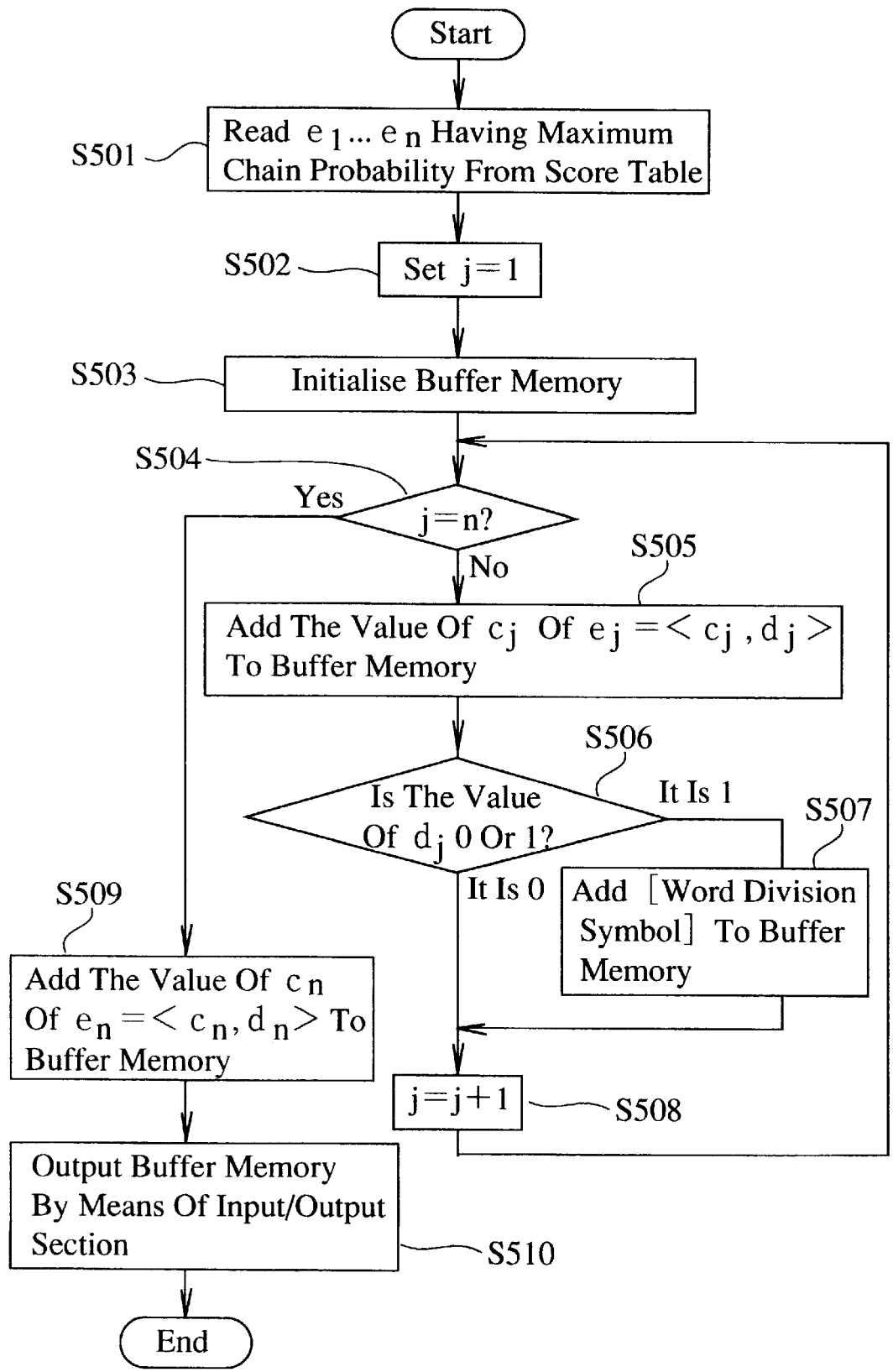
FIG. 13 is a flow chart of processing of output of maximum chain probability given in explanation of the present invention.

Output of this maximum chain probability is performed in the case of this second embodiment by a processing flow identical with the processing already described in the first embodiment with reference to FIG. 13. However, since the content of process S507 and S509 in this second embodiment is different from the case of the first embodiment, these processes S507 and S509 will be described, but explanation of the rest of the processing will not be repeated.

Process S507: in $e_j$=<$c_j$,$d_j$,$t_j$(j)> the value of "[character tag division symbol] $t_j$(j) [word division symbol]" is added to buffer memory 44 (see Table 1).

Process S509: in $e_j=<c_j,d_j,t_j(j)>$, the value of "$c_n$[character tag division symbol] $t_j(j)$" is added to buffer memory 44.

This [character tag division symbol] could be any symbol, but for example "/" (/) is employed.

In this case, the output of process S510 is for example

[kyoo/noun](see Table 1).

Also, in for example a case in which the word division character is an indent code and the character tag division information is a tab, for example the output obtained from "kyoo wa tanjobi da" by process S510 is: in the case where only word division processing is performed:

[kyoo]

[wa]

[tanjobi]

[da ](see Table 1).

Or, in the case where tag affixing is performed:

[kyoo noun]

[wa particle]

[tanjobi noun]

[da auxiliary verb](see Table 1).

The above series of processes is the flow of morphemic inference processing using expanded characters.

In the first and second embodiment described above, the case was described in which the expansion information consisted of word division information and tag information; however, by appending information of any desired type, such as "reading" or "conjugation" instead of or in addition to the tag information, morphological analysis could be performed in the same way for such information.

Also, the memory regions described above could be constituted by respectively independent memories or could be constituted by dividing a single memory into regions.

[Experimental Results]

Experiments were conducted to ascertain the effectiveness of the first and second embodiment described above. The results obtained are described below.

1) Experimental Technique 1-1) First Embodiment (character-division model)

Training: trigrams (three-grams) were constructed from a tagged corpus: these consist of pairs of character and division symbols converted to token form. Specifically, they were divided into two types: characters with a division after the character and characters with no division after the character.

Analysis: for all the characters subjected to analysis, from the combinations of characters that were paired with a division symbol and characters that were not paired with a division symbol, the combinations for which the chain probability of the character trigram was a maximum were found and taken as the result of the analysis (morphemic division).

1-2) Second embodiment (character-tag model)

Training: trigrams obtained by converting to token form sets of character, character division symbol and part of speech were constructed from a tagged corpus.

Analysis: this comprised a technique (technique: head) in which, for all characters to be subjected to analysis, from all possible combinations of division symbol and part of speech, the combination for which the chain probability of the character trigram is a maximum is selected, and, for each morpheme that has been analysed, the part of speech of that morpheme is identified as being the part of speech in the head character set; and a technique (technique: majority decision) in which the part of speech of a morpheme is identified as being the part of speech which is present in greatest number in the parts of speech of tokens containing that morpheme, and, in the case where there are parts of speech which are present in the same number, the part of speech is determined using a part of speech unigram (1-gram). In the following test, the latter of these (technique: majority decision) was employed.

A brief description of (technique: majority decision) will now be given. Let us consider the case where the most likely expanded character sequence of an input text "irukagairu" is as follows:

<i,0,verb><ru,0,noun><ka,1,noun><ga,1,auxiliary>

<i,0,verb><ru,1,auxiliary> (see Table 1).

In this case, division is effected into three words (iruka) (ga) (iru).

Specifically:

<i,0,verb><ru,0,noun><ka,1,noun>

<ga,1,auxiliary>

<i,0,verb><ru,1,auxiliary>.

Regarding the parts of speech, (ga) is unambiguously determined as an auxiliary, but in the case of (iruka) there are a plurality of possibilities, namely, "verb" and "noun", and, in the case of (iru) there are a plurality of possibilities, namely, "verb" and "auxiliary". In this case, regarding (iruka), the candidates are "verb" and "noun", but, since there are two instances of "noun", which is more than the single instance of "verb", "noun" is selected. In contrast, regarding (iru), both "verb" and "auxiliary" are possibilities, but, since there is one instance of each of these, a majority decision is not possible. So, since "verb" is the part of speech that appears most frequently in the training data the output assumes that the part of speech of (iru) is "verb" (see Table 1).

By this (technique: majority decision), for example by analysis of the EDR corpus (corpus disclosed for consideration with the object of research by the Nippon Denshika Jisho Kenkyujo (Electronic Dictionary Research Institute of Japan Limited (Reference: EDR Electronic Dictionary Version Technical Guide, published 1995)), it is found that the order of priority of parts of speech is as follows. Namely: auxiliary, noun, word ending, verb, symbol, auxiliary verb, suffix, numeral, post-position, adjective verb, adjective, participle, conjunction, prefix, interjection.

1-3) Prior Art (word-tag model)

This is a prior art technique using a dictionary and tag chain probability. Trigrams of dictionary parts of speech are constructed from training data. However, since no function is provided for processing unknown words, analysis may be impossible if a word appears in the test data that is not present in the training data. In the present test, in order to avoid failure of analysis, only a closed test was conducted.

2) Training and test data

Hereinbelow, a summary of the corpuses and test conditions used in the test is given. The header (name) of each corpus is employed for referring to the corpuses employed in the following tests.

2-1) EDR

:part of speech information 15 parts of speech.

Training :EDR corpus about 200,000 texts (197,744 texts).

Test :open; 1000 texts not included in the training data.

Closed; 1000 texts for testing purposes added to the training data.

2-2) ADD

:Part of speech information: 120 types of tags of conjugated forms or including conjugated forms.

Training :ATR conversation database (travel and telephone conversations) 8821 texts (corpus disclosed for consideration for purposes of research by ATR Audio Translation Communication Research Institute (ATR Onsei Honyaku Tsushin Kenkyujo) Limited) Reference:

Content of ATR conversation database ATR Technical Report, TR-I-0186, issued 1990) (hereinbelow referred to as ADD).

Test open; 500 texts not included in the training data Closed; 500 texts for the above test added to the training data.

3) Inference of Chain Probabilities

Expanded character trigrams (3-grams) were found by generating expanded character sequences from the training data of the above tagged corpuses. Also, these probabilities were smoothed by bigram (2-gram), and unigram (1-gram).

4) Evaluation Criterion

In the following description, as evaluation criteria, the rate of matching the correct solution (precision) and the recall rate were employed. These criteria are defined as follows.

Rate of matching :number of correct morphemes output by the system/number of morphemes output by the system.
Recall rate :number of correct morphemes output by the system/number of correct morphemes of the test text.

5) Test Results 5-1) Analysis Performance a: first embodiment (CHAR-BOUND) (word division performance)

In this test, a test was performed combining the various techniques and the corpus with the object of finding the differences of basic performance in regard to word division of the respective techniques. FIG. 14 shows the matching rate and recall rate for the open test and closed test respectively.

In the test of the conventional method in the present tests, it was not possible to include a mechanism for dealing with unknown words. Consequently, since, in the open test, there are some words that are not present in the dictionary (in the case of EDR, about 70 words in 1000 texts), which would have been impossible to analyse with the prior art method, only a closed test was conducted. Hereinbelow, comparison of the present invention and the prior art method was effected using a closed test.

In the performance evaluation of word division of FIG. 14, the results in the upper part indicate the matching rate (%) and the results in the lower part indicate the recall rate (%). The matching rate (%) in the present invention was 99.77 in the case of ADD and 97.80 in the case of EDR, so the matching rate of ADD was better than that of EDR. With the prior art method, the matching rate (%) was 95.65 in the case of EDR and 99.52 in the case of ADD, so it can be seen that in both cases the matching rate (%) was much better in the case of the method of the present invention. In contrast, regarding the recall rate (%) of the present invention, this was better in the case of ADD, being 97.44 for EDR and 99.67 in the case of ADD. The recall rate (%) in the case of the prior art method was 91.78 in the case of EDR and 99.27 in the case of ADD, from which it can be seen that in both cases the method of the present invention was better.

As can be seen from the results described above, with the prior art method, in the case of EDR, both the matching rate and recall rate were poor: this was because, since in the EDR corpus there are only 15 types of part of speech, the part of speech trigram has insufficient linguistic modelling capability. This can be seen from the fact that results are improved when the 120 types of part of speech of ADD are employed.

In the case of the technique according to the first embodiment of the present invention, although results were somewhat worse for the EDR corpus than for the ADD corpus, good results were obtained in a comparatively stable manner. It is believed that this is because the chain probabilities of not just parts of speech but pairs of characters and tags were employed.

On examining the analysis of the EDR corpus, it was found that most of the errors were caused by instability of the corpus itself. For example, there is considerable instability as to whether sequences of nouns etc. are to be separated with fine or coarse separations.

b: Second embodiment (CHAR-TAG) (Performance regarding word division and part of speech inference)

This test was conducted in order to establish the basic difference in performance of the various techniques regarding word division and part of speech inference. The results are shown in FIG. 15 by a performance evaluation of part of speech division. In this Figure, the upper part shows the matching rate (%) and the lower part shows the recall rate (%). The performance evaluations of the word division of the second embodiment are shown in FIG. 14.

In the results regarding word division shown in FIG. 14, the matching rate (%) in the case of EDR was 98.25 and in the case of ADD was 99.97 and the recall rate (%) was 97.88 in the case of EDR and 99.82 in the case of ADD. In comparison, the results for performance evaluation of part of speech division shown in FIG. 15 were that the matching rate (%) was 97.42 in the case of EDR and 99.77 in the case of ADD and the recall rate (%) was 97.06 in the case of EDR and 99.61 in the case of ADD. Also, regarding the performance evaluation results for part of speech division obtained by the prior art method, these were: matching rate (%) 92.55 in the case of EDR and 97.82 in the case of ADD and recall rate (%) 88.50 in the case of EDR and 97.52 in the case of ADD.

From these results it can be seen that, compared with word division, with the method employing expanded characters, the matching rate and recall rate are lowered by about 1–2%.

In contrast, with the prior art method, the matching rate and recall rate are lowered by about 2–3%. In an open test, this drops by about a further 3%.

Since the prior art method employs a dictionary, it is quite powerful in respect of word division (if there are no unknown words), but, regarding inference of parts of speech, the technique of the present invention employing expanded characters can be said to have better robustness. In other words, with the prior art method, the probability directly related to words may be said to be difficult to infer accurately even if a fairly large corpus is employed.

5-2) Speed of Analysis

The results in respect of speed of analysis for each technique are shown in FIG. 16. This shows the time required for analysis of the EDR test texts (1000 texts, 38601 characters), i.e. the running time. When analysis was conducted by the respective techniques of the first and second embodiments, the results were respectively 3 seconds and 665 seconds in the case of EDR. From these results, although part of speech inference was much slower, it can be seen that very high speed was obtained in the case of analysis of word division only.

The performance details of the computer used in the tests were: Sun Ultra-1140 MHz, OS: Solaris 2.5, main memory: 96 Mbytes, hard disk: 3 Gbytes.

As is clear from the above description, the following results can be obtained using a Japanese language morphological analysis method and device according to the present invention. Specifically, a) in the present invention, probability calculation is performed based not on words but characters. Since the character length is fixed within a single text, the situation that morpheme sequences with fewer divisions (i.e. longer morpheme sequences) are given priority is avoided. Word division can therefore be performed with higher accuracy than in the prior art method (see 5-1)a above).

b) According to the present invention, a dictionary is not required, since a character N-gram may be thought of as having dictionary information. The complicated operation of compiling a dictionary can therefore be eliminated. For example, if the text "itoshii/hito" is present in the training data, the expanded character table <#,1><#,1><i,0><to,0><shi,0><i,1><hito, 1><#,1><#,1> can be formed and, looking at the word division information, by taking three characters at a time (3-grams), as ⟨#, 1⟩⟨#, 1⟩⟨i, 0⟩ ⟷ i
⟨#, 1⟩⟨i, 0⟩⟨to, 0⟩ ⟷ ito
⟨i, 0⟩⟨to, 0⟩⟨shi, 0⟩ ⟷ itoshi
⟨to, 0⟩⟨shi, 0⟩⟨i, 1⟩ ⟷ itoshii/
⟨shi, 0⟩⟨i, 1⟩⟨hito, 1⟩ ⟷ itoshii/hito/
⟨i, 1⟩⟨hito, 1⟩⟨#, 1⟩ ⟷ itoshii/hito/#
⟨hito, 1⟩⟨#, 1⟩⟨#, 1⟩ the words "itoshii" and "hito" can be accurately extracted. (Word extraction can be performed in this way just as in the case of 2-grams and 1-grams) (see Table 1).

Also, by concurrently calculating the chain probability, the "appropriateness" of this division of "itoshii hito" into these two morphemes can be evaluated.

c) In the present invention, a row of optimum word sequences is determined by finding the chain probabilities of expanded characters. Since the chain probabilities of these expanded characters provide a general word model of Japanese words, morphological analysis of unknown words can be conducted more accurately than with the prior art method using a dictionary.

d) Furthermore, since with the present invention a dictionary is not required, there is the advantage that analysis can be achieved using only word division information, even without using information of tags such as parts of speech. This makes possible processing with very high speed and economy of resources.

e) Furthermore, if, as expansion information, in addition to word division information there is added tag information, in addition to a)–d) as described above, not just word division but also inference of parts of speech can be conducted with higher accuracy and higher speed than conventionally (see 5-1)b above). For example, with the prior art method, in order to infer the appropriateness of candidate word sequences/part of speech sequences, chain probability of parts of speech was employed. However, because the number of parts of speech was not particularly large and only parts of speech that were attached to a tagged corpus were employed, representation of the appropriateness (evaluation) of a chain of word sequences was limited. If the number of parts of speech is made extremely large, more precise evaluation of the appropriateness of word sequences can be achieved, but development of such a corpus is extremely difficult. Compared with this, since, with the technique of the present invention, chains of part of speech and character pairs are employed, even if the number of parts of speech that are assigned in a corpus is small, word sequences are modelled by chains utilising character information, so a much more precise evaluation of the appropriateness of word sequences (taking into account the number of appearances of parts of speech for each character) can be achieved. In this way, a comparison of word sequence candidates representing character sequence divisions and part of speech sequence candidates attached to these word sequences, which comparison takes account the tendencies of the characters that are employed, can be achieved.

f) Furthermore, in addition to the a)–d) described above, by adding, as expansion information, not just tag information but other types of information that may be chosen at will (for example information concerning "reading" or information concerning "conjugation"), analysis results in respect of these items also can be obtained.

TABLE 1

| Roman/English | Japanese |
|---|---|
| "kare" | 「彼」 |
| "ha" | 「は」 |
| "kyoo wa" | 「今日は」 |
| "/kyoo wa/" | 「/今日は/」 |
| "/kyoo/wa/" | 「/今日/は/」 |
| "# ima" | 「#今」 |
| "kyoo" | 「今日」 |
| "verb" | 「動詞」 |
| "noun" | 「名詞」 |
| "auxiliary" | 「副詞」 |
| I | い |
| Ito | いと |
| Itoshi | いとし |
| Itoshii/ | いとしい/ |
| Itoshii/hito/ | いとしい/人/ |
| "itoshii hito" | 「いとしい人」 |
| <kare, 0> | <彼, 0> |
| <kare, 0, pronoun> | <彼, 0, 代名詞> |
| <ima, 0> | <今, 0> |
| <ima, 1> | <今, 1> |
| <hi, 0> | <日, 0> |
| <hi, 1> | <日, 1> |
| <wa, 0> | <は, 0> |
| <wa, 1> | <は, 1> |
| <ima, 0, noun> | <今, 0, 名詞> |
| <ima, 0, auxiliary> | <今, 0, 助詞> |
| <ima, 0, verb> | <今, 0, 動詞> |
| <ima, 1, noun> | <今, 1, 名詞> |
| <ima, 1, auxiliary> | <今, 1, 助詞> |
| <ima, 1, verb> | <今, 1, 動詞> |
| <hi, 0, noun> | <日, 0, 名詞> |
| <hi, 0, auxiliary> | <日, 0, 助詞> |
| <hi, 0, verb> | <日, 0, 動詞> |
| <hi, 1, noun> | <日, 1, 名詞> |
| <hi, 1, auxiliary> | <日, 1, 助詞> |
| <hi, 1, verb> | <日, 1, 動詞> |
| <i, 0, verb> | <い, 0, 動詞> |

TABLE 1-continued

| Roman/English | Japanese |
|---|---|
| <ru, 0, noun> | <る, 0, 名詞> |
| <ka, 1, noun> | <か, 1, 名詞> |
| <ga, 1, auxiliary> | <が, 1, 助詞> |
| <i, 0, verb> | <い, 0, 動詞> |
| <ru, 1, auxiliary> | <る, 1, 副詞> |
| <i, 0> | <い, 0> |
| <to, 0> | <と, 0> |
| <shi, 0> | <し, 0> |
| <hito, 1> | <人, 1> |
| [ima        ] | [今日      ] |
| [kyoo _     ] | [今日_     ] |
| [kyoo _ wa   ] | [今日_は   ] |
| [character tag division symbol] | [文字タグ区切り記号] |
| [word division symbol] | [単語区切り記号] |
| [kyoo/noun     ] | [今日/名詞   ] |
| "kyoo wa tanjobi da" | [今日は誕生日だ] |
| [kyoo        ] | [今日      ] |
| [wa         ] | [は        ] |
| [tanjobi      ] | [誕生日     ] |
| [da         ] | [だ        ] |
| [kyoo     noun] | [今日    名詞] |
| [wa    particle] | [は    副助詞] |
| [tanjobi    noun] | [誕生日   名詞] |
| [da   auxiliary verb] | [だ    助動詞] |
| (iruka) | (いるか) |
| (ga) | (が) |
| (iru) | (いる) |

What is claimed is:

1. A method of morphological analysis comprising the steps of:
   (a) using language text as input text;
   (b) for each character of an input character sequence of said input text, forming an expanded character by addition of expansion information including at least word division information, and generating all expanded character sequences relating to said input character sequence, using said expanded characters;
   (c) finding chain probabilities of all the expanded character sequences that are generated;
   (d) selecting as an optimum expanded character sequence an expanded character sequence that gives a chain probability of maximum value from among the chain probabilities obtained; and
   (e) outputting, as a morphological analysis result, the result of analysis including a row of word sequences determined by said optimum expanded character sequence.

2. The method of morphological analysis according to claim 1 wherein the input character sequence is formed by adding control characters at the beginning and at the end of each sentence of the input text.

3. The method of morphological analysis according to claim 1, wherein the morphological analysis result is made to include a row of tag sequences by including tag information in the expansion information.

4. The method of morphological analysis according to claim 1 wherein the morphological analysis result is made to contain analysis results relating to freely selectable information by including freely selectable information consisting of reading information and/or conjugation information or any other information, in addition to the word division information and tag information, in the expansion information.

5. The method of morphological analysis according to claim 1 wherein the word division information is appended immediately after each character of said input character sequence.

6. The method of morphological analysis according to claim 3 wherein the word division information is appended immediately after each character of said input character sequence and the tag information is appended immediately after the word division information.

7. The method of morphological analysis according to claim 1 wherein:
   step (a) includes a substep of reading said input text into buffer memory where it is freely stored;
   step (b) includes a substep of reading said input character sequence from the buffer memory, and a substep of reading said expanded character sequence into a first memory region where it is freely stored; and
   step (c) includes a substep of finding by previous learning the corresponding partial chain probabilities of respective partial expanded character sequences comprising a fixed number of characters in order and constituting said expanded character sequences, reading these into a second memory region where they are freely stored; a substep of, for each respective expanded character sequence read from said first memory region, reading from said second memory region all the partial chain probabilities constituting the expanded character sequence and respectively finding their product as the chain probability; and a substep of reading these chain probabilities into a third memory region where they are freely stored.

8. The method of morphological analysis according to claim 1 wherein the word division information is constituted by binary information that represents whether or not a morphemic division is generated immediately after the character position of the character to which this word division information is attached.

9. A morphological analysis device comprising:
   (a) an expanded character generating section that reads a language text as input text and that, for each character of an input character sequence of this input text, forms an expanded character by appending expansion information including at least word division information and that forms all expanded character sequences relating to said input character sequence using said expanded characters;
   (b) a chain probability calculating section that finds chain probabilities of all said expanded character sequences that are generated; and
   (c) an optimum path searching section that selects as an optimum expanded character sequence an expanded character sequence that gives the maximum value of the chain probability, from among the chain probabilities obtained, and that outputs as a morphological analysis result an analysis result including a row of word sequences corresponding to said expanded character sequences.

10. The morphological analysis device according to claim 9 wherein said expanded character sequence generating section includes means for adding control characters that forms said input character sequence by adding control characters at the beginning and at the end of each sentence of said input text.

11. The morphological analysis device according to claim 9 wherein the expansion information includes tag information and the result of the morphological analysis includes a row of tag sequences.

12. The morphological analysis device according to claim 9 wherein the expansion information includes arbitrarily selectable information consisting of reading information and/or conjugation information apart from the two items of information constituted by the word division information and tag information, and the morphological analysis analysis results concerning the arbitrarily selectable information.

13. The morphological analysis device according to claim 9 wherein the word division information is appended immediately after each character of said input character sequence.

14. The morphological analysis device according to claim 11 wherein the word division information is appended immediately after each character of said input character sequence and the tag information is appended immediately after the word division information.

15. The morphological analysis device according to claim 9, comprising:
   a buffer memory in which the input text is stored and whence the input text can be read to the expanded character generating section;
   a first memory region in which said optimum expanded character sequence is stored and whence this optimum expanded character sequence can be read to said chain probability calculating section;
   a second memory region in which the partial chain probabilities found by learning, respectively corresponding to the partial expanded character sequences consisting of a fixed number of characters in order constituting the optimum expanded character sequence, are stored beforehand and whence the partial chain probabilities can be read to said chain probability calculating section; and
   a third memory region wherein the chain probability is stored and whence this chain probability can be read to said optimum path searching section;
   further including a calculating stage into which said chain probability calculating section reads, from said second memory region, for each respective expanded character sequence that is read from said first memory region, all the partial chain probabilities constituting this optimum expanded character sequence, and which finds their respective product as the chain probability.

16. The morphological analysis device according to claim 9 wherein said buffer memory reads said input character sequences formed by said expanded character generating section by adding control characters at the beginning and at the end of each sentence of said input text to said expanded character sequence generating section, where they are freely stored.

17. The morphological analysis device according to claim 9 wherein the word division information is constituted by binary information that indicates whether or not a morphemic division is generated immediately after the character position of the character to which the word division information in question is added.

18. A method of morphological analysis of Japanese comprising the steps of:
   a) reading language text as input text;
   b) for each character of an input character sequence of said input text, forming an expanded character by addition of expansion information including at least word division information, and generating all expanded character sequences relating to said input character sequence, using said expanded characters;
   c) finding chain probabilities of all the expanded character sequences that are generated;
   d) selecting as an optimum expanded character sequence an expanded character sequence that gives a chain probability of maximum value from among the chain probabilities obtained; and
   e) outputting, as morphological analysis result, the result of analysis including a row of word sequences determined by said optimum expanded character sequence.

19. The method of morphological analysis of Japanese according to claim 18 wherein the input character sequence is formed by adding control characters at the beginning and at the end of each sentence of the input text.

20. The method of morphological analysis of Japanese according to claim 18, wherein the morphological analysis result is made to include a row of tag sequences by including tag information in the expansion information.

21. The method of morphological analysis of Japanese according to claim 18 wherein the morphological analysis result is made to contain analysis results relating to freely selectable information by including freely selectable information consisting of reading information and/or conjugation information or any other information, in addition to the word division information and tag information, in the expansion information.

22. The method of morphological analysis of Japanese according to claim 18 wherein the word division information is appended immediately after each character of said input character sequence.

23. The method of morphological analysis of Japanese according to claim 20 wherein the word division information is appended immediately after each character of said input character sequence and the tag information is appended immediately after the word division information.

24. The method of morphological analysis of Japanese according to claim 18 wherein:
   step (a) includes a substep of reading said input text into buffer memory where it is freely stored;
   step (b) includes a substep of reading said input character sequence from the buffer, memory and a substep of reading said expanded character sequence into a first memory region where it is freely stored; and
   step (c) includes a substep of finding by previous learning the corresponding partial chain probabilities of respective partial expanded character sequences comprising a fixed number of characters in order and constituting said expanded character sequences, reading these into a second memory region where they are freely stored; a substep of, for each respective expanded character sequence read from said first memory region, reading from said second memory region all the partial chain probabilities constituting the expanded character sequence and respectively finding their product as the chain probability; and a substep of reading these chain probabilities into a third memory region where they are freely stored.

25. The method of morphological analysis of Japanese according to claim 18 wherein the word division information is constituted by binary information that represents whether or not a morphemic division is generated immediately after the character position of the character to which this word division information is attached.

26. A Japanese language morphological analysis device comprising:
   (a) an expanded character generating section that reads a Japanese-language text as input text and that, for each character of an input character sequence of this input text, forms an expanded character by appending expansion information including at least word division information and that forms all expanded character sequences relating to said input character sequence using said expanded characters;
   (b) a chain probability calculating section that finds the chain probabilities of all said expanded character sequences that are generated; and
   (c) an optimum path searching section that selects as an optimum expanded character sequence an expanded character sequence that gives the maximum value of the chain probability, from among the chain probabilities obtained, and that outputs as a morphological analysis result an analysis result including a row of word sequences corresponding to said expanded character sequences.

27. The Japanese language morphological analysis device according to claim 26 wherein said expanded character sequence generating section includes means for adding control characters that forms said input character sequence by adding control characters at the beginning and at the end of each sentence of said input text.

28. The Japanese language morphological analysis device according to claim 26 wherein the expansion information includes tag information and the result of the morphological analysis includes a row of tag sequences.

29. The Japanese language morphological analysis device according to claim 26 wherein the expansion information includes arbitrarily selectable information consisting of reading information and/or conjugation information apart from the two items of information constituted by the word division information and tag information, and the morphological analysis results include analysis results concerning the arbitrarily selectable information.

30. The Japanese language morphological analysis device according to claim 26 wherein the word division information is appended immediately after each character of said input character sequence.

31. The Japanese language morphological analysis device according to claim 28 wherein the word division information is appended immediately after each character of said input character sequence and the tag information is appended immediately after the word division information.

32. The Japanese language morphological analysis device according to claim 26, comprising:
   a buffer memory in which the input text is stored and whence the input text can be read to the expanded character generating section;
   a first memory region in which said optimum expanded character sequence is stored and whence this optimum expanded character sequence can be read to said chain probability calculating section;
   a second memory region in which the partial chain probabilities found by learning, respectively corresponding to the partial expanded character sequences consisting of a fixed number of characters in order constituting the optimum expanded character sequence, are stored beforehand and whence the partial chain probabilities can be read to said chain probability calculating section; and
   a third memory region wherein the chain probability is stored and whence this chain probability can be read to said optimum path searching section;
   further including a calculating stage into which said chain probability calculating section reads, from said second memory region, for each respective expanded character sequence that is read from said first memory region, all the partial chain probabilities constituting this optimum expanded character sequence, and which finds their respective product as the chain probability.

33. The Japanese language morphological analysis device according to claim 26 wherein said buffer memory reads said input character sequences formed by said expanded character generating section by adding control characters at the beginning and at the end of each sentence of said input text to said expanded character sequence generating section, where they are freely stored.

34. The Japanese language morphological analysis device according to claim 26 wherein the word division information is constituted by binary information that indicates whether or not a morphemic division is generated immediately after the character position of the character to which the word division information in question is added.

* * * * *